(12) United States Patent
Kakani et al.

(10) Patent No.: US 8,064,374 B2
(45) Date of Patent: Nov. 22, 2011

(54) POWER SAVE MECHANISM FOR WIRELESS COMMUNICATION DEVICES

(75) Inventors: Naveen Kakani, Irving, TX (US); Jakub Majkowski, Helsinki (FI)

(73) Assignee: Nokia Corporation, Espoo (FI)

( * ) Notice: Subject to any disclaimer, the term of this patent is extended or adjusted under 35 U.S.C. 154(b) by 862 days.

(21) Appl. No.: 12/118,207

(22) Filed: May 9, 2008

(65) Prior Publication Data
US 2009/0279464 A1    Nov. 12, 2009

(51) Int. Cl.
*H04W 4/00* (2009.01)
*H04W 52/02* (2009.01)

(52) U.S. Cl. ......... 370/311; 370/336; 370/341; 370/346

(58) Field of Classification Search ............... None
See application file for complete search history.

(56) References Cited

U.S. PATENT DOCUMENTS

| | | | |
|---|---|---|---|
| 7,245,946 B2 | 7/2007 | Liu | |
| 2003/0231608 A1 | 12/2003 | Wentink | |
| 2005/0018624 A1 | 1/2005 | Meier et al. | |
| 2005/0114537 A1* | 5/2005 | Griswold et al. | 709/231 |
| 2007/0159992 A1* | 7/2007 | Kim | 370/311 |
| 2007/0161364 A1 | 7/2007 | Surineni et al. | |
| 2007/0230418 A1 | 10/2007 | Takeuchi et al. | |
| 2008/0069047 A1 | 3/2008 | Yee et al. | |
| 2008/0144559 A1* | 6/2008 | Griswold et al. | 370/311 |
| 2008/0279163 A1* | 11/2008 | Desai | 370/338 |
| 2009/0124301 A1* | 5/2009 | Raissinia | 455/574 |
| 2010/0165896 A1 | 7/2010 | Gong et al. | |
| 2010/0271995 A1 | 10/2010 | Seok et al. | |
| 2011/0038291 A1 | 2/2011 | Seok | |
| 2011/0072285 A1 | 3/2011 | Fischer et al. | |

FOREIGN PATENT DOCUMENTS

| | | |
|---|---|---|
| EP | 1033832 | 9/2000 |
| EP | 1 441 550 | 7/2004 |
| WO | WO2005069806 | 8/2005 |

OTHER PUBLICATIONS

International Preliminary Report of Patentability for PCT/IB2009/051827 dated Aug. 12, 2010.

(Continued)

*Primary Examiner* — Chi Pham
*Assistant Examiner* — Soon-Dong Hyun
(74) *Attorney, Agent, or Firm* — Locke Lord LLP

(57) ABSTRACT

Method, apparatus, and computer program product embodiments are disclosed to enable power save modes of operation between mobile wireless devices for direct data transfer in an infrastructure BSS. An example embodiment inserts in a message that is transmitted by the transmitting mobile wireless device, a specified time when a next active direct data transfer period will start so that the devices can remain in power save mode in a direct data transfer link until that time. Then, when the next active direct data transfer period is about to start, the receiving device sends a trigger signal based on the specified time, the trigger signal indicating that the next period is about to start. This confirms to the transmitting device that the receiving device has awakened, so that the transmitting device may start transmitting the data to the receiving device via the direct data transfer link.

42 Claims, 16 Drawing Sheets

OTHER PUBLICATIONS

Miller, M.J. et al., "Improving Power Save Protocols using carrier Sensing for Dynamic Advertisement Windows"; Mobile Adhoc and Sensor Systems Conference, 2005 IEEE International Conference on Nov. 7, 2005, Piscataway, NJ, USA, IEEE, Nov. 7, 2005, pp. 475-482, XP010858905; ISBN: 978-0-7803-9465-0, the whole document.
The International Search Report (ISR) dated Sep. 10, 2009, cited in PCT Application No. PCT/IB2009/051827.

Hayoung Yoon et al., "iDLS: Inter-BSS Direct Link Setup in IEEE 802.11 WLANS", Communications and Informations Technologies, 2007, ISCIT '07, International Symposium Jan. 10, 2007, pp. 1015-1020.

PCT International Search Report dated Oct. 14, 2009 for PCT/FI2009/050552.

* cited by examiner

POWER SAVE MECHANISM FOR WIRELESS COMMUNICATION DEVICES

FIELD

The field of the invention relates to wireless communication and more particularly to power saving in wireless communication devices.

BACKGROUND

Modern society has quickly adopted, and become reliant upon, handheld devices for wireless communication. For example, cellular telephones continue to proliferate in the global marketplace due to technological improvements in both the communication quality and device functionality. These wireless communication devices have become common for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate wireless communication over large geographic areas. These network technologies have commonly been divided by generations, starting in the late 1970s to early 1980s with first generation (1G) analog cellular telephones that provided baseline voice communication, to modern digital cellular telephones. Global System for Mobile Communications (GSM) is an example of a widely employed 2G digital cellular network communicating in the 900 MHz/1.8 GHz bands in Europe and at 850 MHz and 1.9 GHz in the United States. This network provides voice communication and also supports the transmission of textual data via the Short Messaging Service (SMS). SMS allows a wireless communications device (WCD) to transmit and receive text messages of up to 160 characters, while providing data transfer to packet networks, Integrated Services Digital Network (ISDN) and Plain Old Telephone Service (POTS) users at 9.6 Kbps. The Multimedia Messaging Service (MMS), an enhanced messaging system allowing for the transmission of sound, graphics and video files in addition to simple text, has also become available in certain devices. Soon, emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receive data at a rate of 720 Kbps within a range of 10 meters, and may transmit up to 100 meters with additional power boosting. Enhanced Data Rate (EDR) technology, which is also available, may enable maximum asymmetric data rates of 1448 Kbps for a 2 Mbps connection and 2178 Kbps for a 3 Mbps connection. In addition to Bluetooth™, other popular short-range wireless networks include for example IEEE 802.11 Wireless LAN, Wireless Universal Serial Bus (WUSB), Ultra Wideband (UWB), ZigBee (IEEE 802.15.4 and IEEE 802.15.4a), wherein each of these exemplary wireless mediums have features and advantages that make them appropriate for various applications The IEEE 802.11 Wireless LAN Standards describe two major components, a mobile wireless device, called a station (STA), and a fixed access point (AP) wireless device. The AP may perform the wireless-to-wired bridging from STAs to a wired network. The basic network is the basic service set (BSS), which is a group of wireless devices that communicate with each other. An infrastructure BSS is a network that has an AP as an essential node.

The access point (AP) in legacy IEEE 802.11 Wireless LAN networks must relay all communication between the mobile wireless devices (STAs) in an infrastructure BSS. If a STA in an infrastructure BSS wishes to communicate a frame of data to a second STA, the communication must take two hops. First, the originating STA transfers the frame to the AP. Second, the AP transfers the frame to the second STA.

The access point (AP) in an infrastructure BSS assists those mobile wireless devices (STAs) attempting to save power. The legacy IEEE 802.11e Wireless LAN standards provides for support of low power operation in handheld and battery operated STAs, called automatic power save delivery (APSD). A STA capable of APSD and currently in the power saving mode, will wake up at predetermined beacons received from the AP to listen to a Traffic Indication Map (TIM). If existence of buffered traffic waiting to be sent to the STA is signaled through the TIM, the STA will remain awake until AP sends out all the data. The STA does not need to send a polling signal to the AP to retrieve data, which is the reason for the term "automatic" in the acronym APSD.

Two variations of the APSD feature are unscheduled automatic power save delivery (U-APSD) and scheduled automatic power save delivery (S-APSD). In U-APSD, the access point (AP) is always awake and hence a mobile wireless device (STA) in the power save mode can send a trigger frame to the AP when the STA wakes up, to retrieve any queued data at the AP and also transmit any data queued from the STA to the AP. In S-APSD, the AP assigns a schedule to a STA and the STA wakes up at the assigned time to retrieve from the AP any data queued for the STA. An AP can maintain multiple schedules either with the same STA or with different STAs in the infrastructure BSS network. Since the AP is never in sleep mode, an AP will maintain different scheduled periods of transmission with different STAs in the infrastructure BSS network to ensure that the STAs get the maximum power savings.

A next generation IEEE 802.11 WLAN standard is being currently developed as the IEEE 802.11 TGz standard, which includes the feature of Tunneled Direct Link Setup (TDLS) with Channel Switching. This feature enables two mobile wireless devices (STAs) in an infrastructure BSS to directly exchange frames of data over a direct data transfer link, without requiring the access point (AP) in the infrastructure BSS to relay the frames. However, the IEEE 802.11 TGz standard currently under development does not provide means for multiple STAs to enter into a power saving sleep mode, since the AP is no longer available to buffer the frames in the direct data transfer link between the STAs.

SUMMARY

Method, apparatus, and computer program product embodiments are disclosed to enable power save modes of operation between mobile wireless devices for direct data transfer in an infrastructure BSS.

An example embodiment enables a power save mode operation between the mobile wireless devices for direct data transfer. Prior to a transmitting mobile wireless device entering the power save mode, it inserts into a message it transmits to a receiving mobile wireless device, a specified time field to indicate when a next active direct data transfer period will start, so that the devices can remain in power save mode in a direct data transfer link until that time. The value of the time field is set to the next "wakeup time". The message may be, for example, the last message that is transmitted by the transmitting mobile wireless device in the final frame, for instance where the frame has the End Of Service Period (EOSP) bit set to 1 instead of 0. The message may be sent over the direct data transfer link to the receiving mobile wireless device or alternately, it may be sent through an access point wireless device or any other wireless device to the receiving mobile wireless device. The specified time in the message indicates to the receiving device when the two devices may start a next active direct data transfer period, service period or session, for example, to transfer data or to complete an operation between two devices over the direct data transfer link. The message may enable both the transmitting and receiving devices to begin a power save mode in the direct data transfer link and to remain in the power save mode until the specified time, when the transmitting device may start transmitting data to the receiving device via the direct data transfer link.

Then, when the next active direct data transfer period is about to start, the receiving device sends a trigger signal based on the specified time indication, the trigger signal indicating that the next period is about to start, so that the transmitting device can start transmitting data to the receiving device via the direct data transfer link. The trigger signal may be sent over the direct data transfer link to the transmitting mobile wireless device or alternately, it may be sent through an access point wireless device or any other wireless device to the transmitting mobile wireless device.

The signaling between the mobile wireless devices enables the devices to enter into and return from the power save mode for a direct data transfer communication link. The embodiment enables two mobile wireless devices to share a common view of the time intervals when they need to be available for the beginning of the next active direct data transfer period, service period or session for direct data transfer. Neither of the mobile wireless devices needs to be available all the time, as is necessary in the legacy 802.11 access point (AP). Instead, the mobile wireless devices can directly signal their availability to each other. After that, the two mobile wireless devices handle the next active direct data transfer period, service period or session and complete it.

An example embodiment enables a mobile wireless device in an infrastructure BSS to manage two or more direct data transfer links with two or more other mobile wireless devices in that BSS and coordinate entering into and returning from the power save mode for each direct data transfer link. If one of the mobile wireless devices has data to transmit to each of the other mobile wireless devices, the transmitting device can specify to each receiving device substantially the same starting time when the next active direct data transfer period, service period or session will start, to reduce the number of on/off transitions so as to minimize power consumption. If a first mobile wireless devices has data to transmit over a first direct data transfer link to a second mobile wireless device and receives an indication of a starting time when it will receive data over a second direct data transfer link from a third mobile wireless device in the infrastructure BSS, the first mobile wireless device can specify substantially the same starting time to the second mobile wireless device when the next active direct data transfer period, service period or session will start over the first direct data transfer link, to reduce the number of on/off transitions so as to minimize power consumption.

In an example embodiment, when a mobile wireless device (STA) conducting a service in a direct data transfer link, enters the power save mode, it is in a light sleep state. The service may be, for example, a session required to transfer data or to complete an operation between two devices over the direct data transfer link. When the service ends, the mobile wireless device can go into deep sleep state. Deep sleep indicates that the direct link is inactive, but the credentials for the link between the first and second devices are still valid and hence could be used with the next service. Thus, for the next service between the first and second devices (STAs), no link set up is required and only activation of the direct data transfer link is needed. The activation procedure uses the U-APSD packet delivery mechanism between the two mobile wireless devices in the same infrastructure BSS through the access point (AP). For instance, if the second device wants to start a new service with the first device, it sends a traffic indication map (TIM) encapsulated in a data frame to the first device. The first step is the second device uses the U-APSD mechanism and sends the encapsulated data to the access point (AP). The access point (AP) then performs normal packet delivery to the first device, so the AP indicates in the beacon frame that there is a packet for the first device. Consequently, the first device transmits a poll frame to the AP to retrieve the encapsulated data and after that it sends a trigger frame to the second device over the direct data transfer link to receive the data packets buffered for it in the second device. The second device transmits the data packets to the first device over the direct data transfer link.

In an example embodiment, the transmitting mobile wireless device may transmit the message initiating the power save modes to the receiving mobile wireless device over a common node path through the access point (AP) or any other wireless station, according to at least one embodiment.

In an example embodiment, when the next active direct data transfer period, service period or session is about to start, the receiving STA may send a trigger indication over the common node path to the access point (AP) or any other wireless station, for relaying the trigger indication to the transmitting STA over the common node path to the receiving STA.

DISCUSSION OF EXAMPLE EMBODIMENTS OF THE INVENTION

Figure 1A:
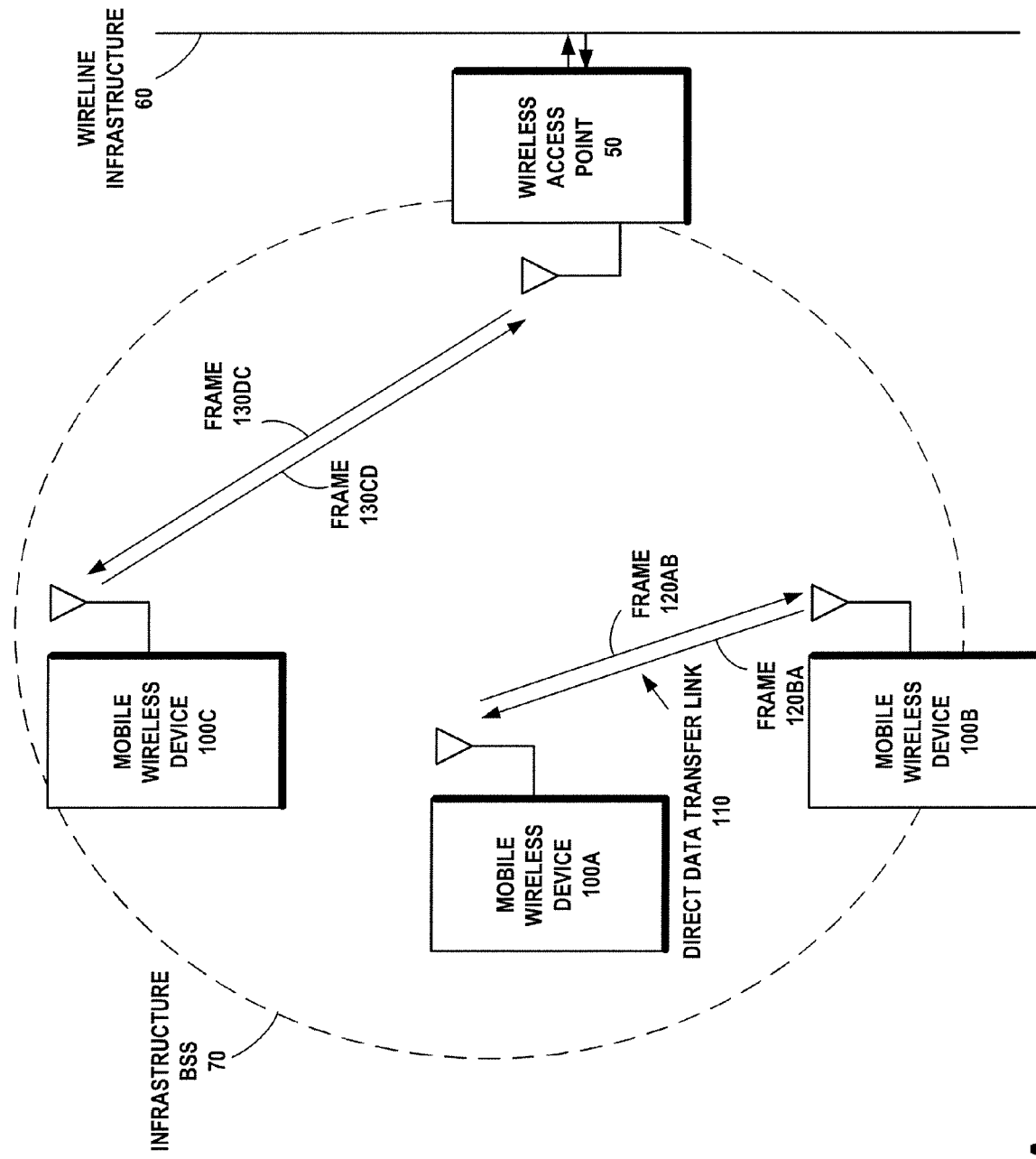
FIG. 1A is an example network diagram of an infrastructure BSS network, with three mobile wireless devices (STAs) and an access point (AP), which performs wireless-to-wired bridging from the STAs to a wired infrastructure network.

FIG. 1A is an example embodiment network diagram of an exemplary infrastructure BSS network 70, with three mobile wireless devices (STAs) 100A, 100B, and 100C and an access point (AP) 50, which performs wireless-to-wired bridging from the STAs 100A, 100B, and 100C to a wired infrastructure network 60. The STAs 100A, 100B, and 100C may operate under the IEEE 802.11 TGz WLAN standard, which includes the feature of Direct Link Setup (DLS). DLS enables the STAs 100A, 100B, and 100C in the infrastructure BSS 70 to directly exchange frames of data over a direct data transfer link, without requiring the access point (AP) 50 in the infrastructure BSS to relay the frames. For example, FIG. 1A shows the STAs 100A and 100B directly exchanging frames of data 120AB and 120BA over the direct data transfer link 110 according to the IEEE 802.11 TGz WLAN standard. The access point (AP) 50 can, for example, operate under a legacy WLAN standard, such as the IEEE 802.11e Wireless LAN standard according to at least one embodiment. For example, FIG. 1A shows the STA 100C and the AP 50 exchanging frames of data 130DC and 130CD in accordance with the IEEE 802.11e WLAN standard. In addition to the access point (AP) 50 performing the wireless-to-wired bridging from the mobile wireless devices (STAs) 100A and 100B to the wired infrastructure network 60, the access point (AP) 50 can also relay communications between the mobile wireless devices (STAs) 100A, 100B, and 100C in the infrastructure BSS 70.

Figure 1B:
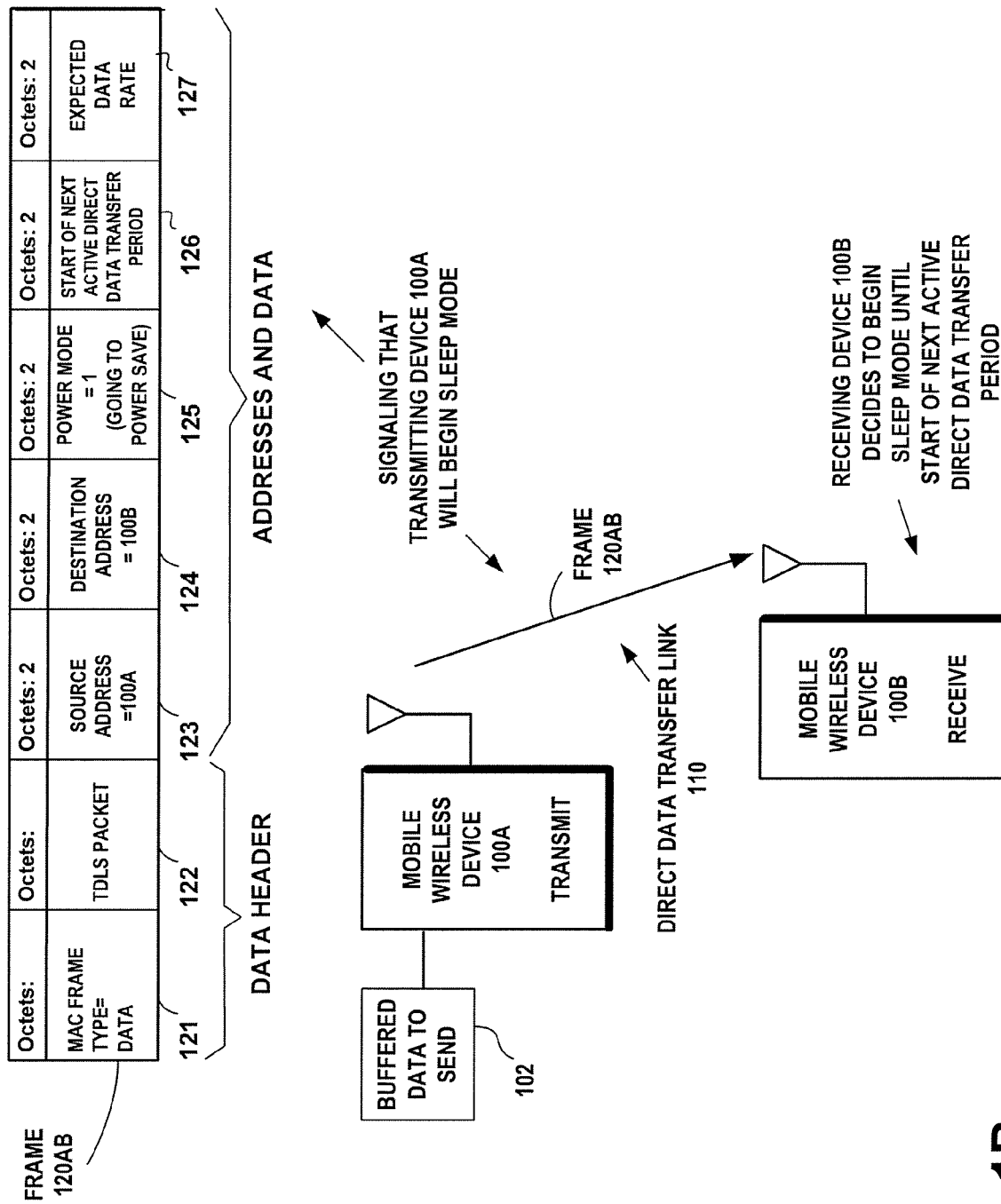
FIG. 1B is an example of the initiation of a power save mode operation between the STAs over the direct data transfer link.

FIG. 1B illustrates an example embodiment of the initiation of a power save mode of operation between the STAs 100A and 100B over the direct data transfer link 110 according to at least one embodiment. This example embodiment is applicable to method, apparatus and computer program products. Prior to the transmitting mobile wireless device STA 100A entering the power save mode, it inserts into a message in frame 120AB that it transmits to the receiving mobile wireless device STA 100B, a specified time field 126 to indicate when a next active direct data transfer period will start, so that the devices STA 100A and STA 100B can remain in power save mode in the direct data transfer link 110 until that time. The value of the time field 126 is set to the next "wakeup time". The message may be, for example, the last message that is transmitted by the transmitting mobile wireless device in the final frame, for instance where the frame has the End Of Service Period (EOSP) bit set to 1 instead of 0.

FIG. 1B shows the message frame 120AB that the transmitting STA 100A may transmit, for example, in a last message frame of an active direct data transfer period, service period or session on the direct data transfer link 110, indicating in field 125 that it intends to begin the power save or sleep mode. The active direct data transfer period, service period or session may be, for example, the duration of a session required to transfer data or to complete an operation between two devices over the direct data transfer link. The example embodiment of FIG. 1B shows the transmitting STA 100A is expecting to have data 102 to be transmitted to the receiving STA 100B. FIG. 1B shows the transmitting STA 100A inserting in the last message frame 120AB according to an embodiment, a specified time 126 when the next active direct transfer period, service period or session will start and the expected data rate 127, which will enable the receiving STA 100B to decide whether it wants to coordinate beginning of its power save mode for the same time as the transmitting STA 100A and coordinate remaining in the power save mode until that specified time 126 occurs, when both STAs 100A and 100B should be awake. In this manner STA 100A and STA 100B may coordinate entering into and returning from the power save mode over the direct data transfer link. The STAs 100A and 100B will be in the sleep mode with respect to the direct data transfer link 110, but most likely the Access point (AP) 50 with which they are associated will not know that they are in the sleep mode with respect to the direct data transfer link 110, as the STA's 100A and 100B may remain active in respect to the infrastructure BSS network 70 while being the sleep mode with respect to the direct data transfer link 110. FIG. 1B shows an example of the last message frame 120AB as a MAC frame including a header portion and an address and data portion. The example header portion may include a field 121 indicating that the frame is a data frame and a field 122 that indicates it is a Tunneled Direct Link Setup (TDLS) packet. The example addresses 123 and 124 indicate the transmitting STA 100A and receiving STA 100B. The example fields 125, 126, and 127 indicate the next power mode, the specified time when the next active direct data transfer period, service period or session will start, and the expected data rate, respectively. It should be noted that the FIG. 1B is only an example and other frame formats may be used without departing the scope of the present invention. Further, it should be noted that the present application is not intended to be limited only to embodiments where the last message frame includes the indications relating to power save mode of direct data transfer link 110.

In the specification of the next transmission time to indicate when the next active direct data transfer period will start, the value in the time field 126 may be signaled in units of the Time Unit (TU), which is used to indicate a unit of time equal to 1024 microseconds. The value in the time field 126 is specified relative to the Timing Synchronization Function (TSF) transmitted in the last beacon from the access point (AP) 50. In an Independent Basic Service Set (IBSS) or an Ad-hoc network, the time field 126 is specified relative to the TSF in the last beacon. In the case of multi-band operation, where the STAs 100A and 100B are associated with the access point (AP) 50 in one band, but are using another band for their communication over the direct data transfer link 110, then the TSF of the access point (AP) 50 in the common band they share with the AP, is used.

In another example embodiment, the transmitting STA 100A and the receiving STA 100B may agree in a handshaking protocol over:
a) the direct data transfer link 110, or
b) the common path 115 through the AP,
on the common "wakeup time". The transmitting STA 100A may suggest a schedule to the receiving STA 100B and the receiving STA 100B may respond with an alternate suggestion, until both stations negotiate an agreement on a common "wakeup time".

In another embodiment, the transmitting STA 100A and the receiving STA 100B, after agreeing on a common wakeup time interval, may only send updates to that time if it is going to be changed. No signaling is required if wakeup time is not changing from established time. Hence, support for periodic power save schedule can be provided. A handshake protocol conducted by the transmitting STA 100A and the receiving STA 100B over either the common node path 115 through the AP or direct path when creating or activating the direct data transfer link 110 may negotiate the starting instant of the first "wakeup time", the duration of the power save and awake intervals. The common node path 115 is a data transfer path that includes the access point 50 or any other wireless station.

In yet another example embodiment, the start time of the next active direct data transfer period, service period or session may be calculated by the transmitting STA 100A in the following manner:

1. A traffic specification (TSPEC) information element may be sent by the transmitting STA 100A to the receiving STA 100B in a management frame, which may indicate the expected data rate and the service period of the data transfer.

2. The transmitting STA 100A may be the one in control to make a decision regarding the time when the receiving STA 100B needs to be awake to receive the data from the transmitting STA 100A. Therefore, in the last data frame transmitted 120AB, the transmitting STA 100A signals the receiving STA 100B the start time for the next data transmission.

Some of the constraints based on which transmitting STA 100A picks the start time may include:
(a) Number of STAs to which the transmitting STA 100A is transmitting data and their traffic pattern. In the scenario where there are one or more STAs in the infrastructure BSS 70, which are scheduled to receive data from the transmitting STA 100A and the traffic patterns are such that:
there is an overlap in the service periods
have the same service period
the service period for the STAs are multiples of each other . . . etc,
then the STAs 100A and 100B may be scheduled to be awake at the same time whenever possible (such as in a multiple of service period or an overlap service period). This may be used for minimizing the number of times the transmitting STA 100A would need to be awake to transmit the data.
(b) If the transmitting STA 100A is also a receiver (to receive data from another STA 100C and not the receiving STA 100B) and the transmitting STA 100A is already scheduled to be awake at a certain period of time, then the transmitting STA 100A may schedule the receiving STA 100B, which is to receive data from the transmitting STA 100A, to be awake at a time close to transmitting STA 100A's awake time and still meet the Quality of Service (QoS) requirement.

Figure 2A:
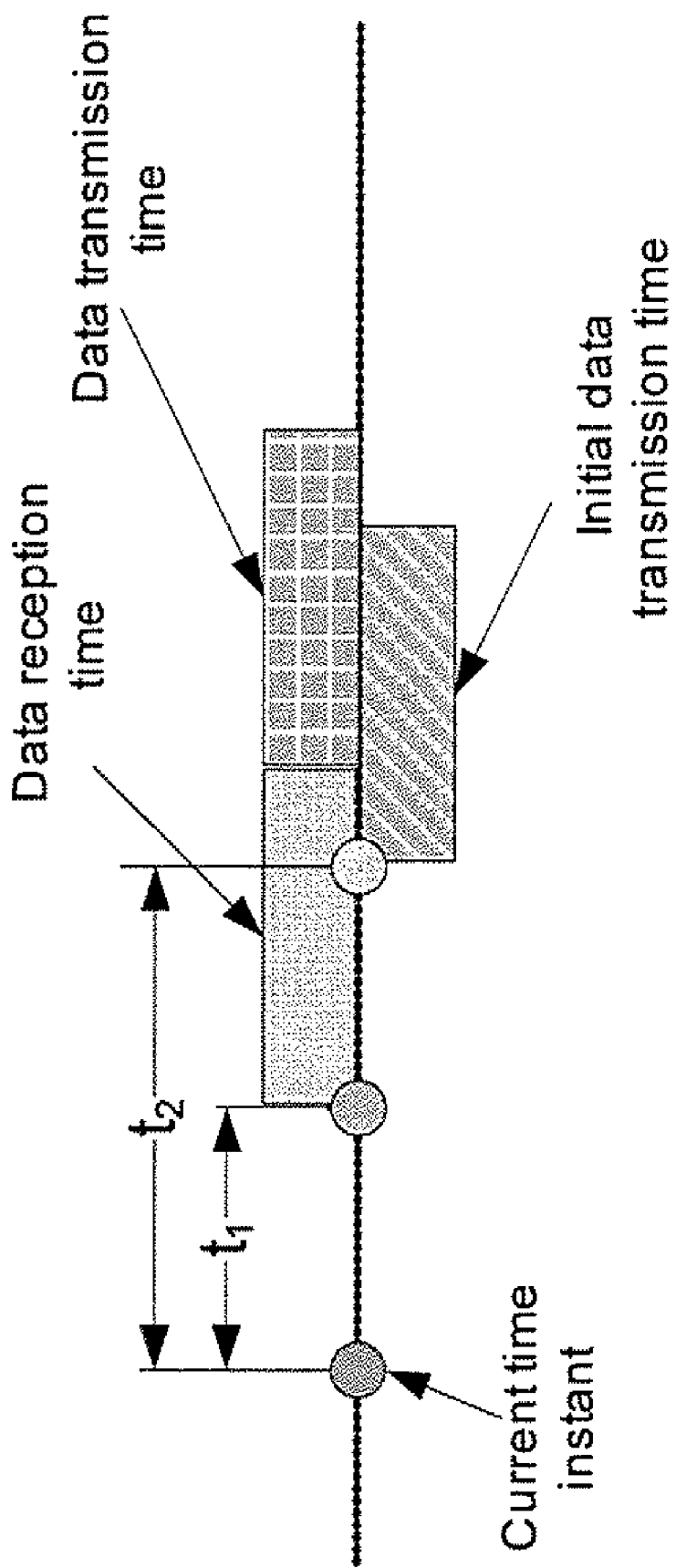
FIG. 2A illustrates a first example of conditions used to determine the start time of the next transmission by the transmitting STA according to at least one embodiment.
Figure 2B:
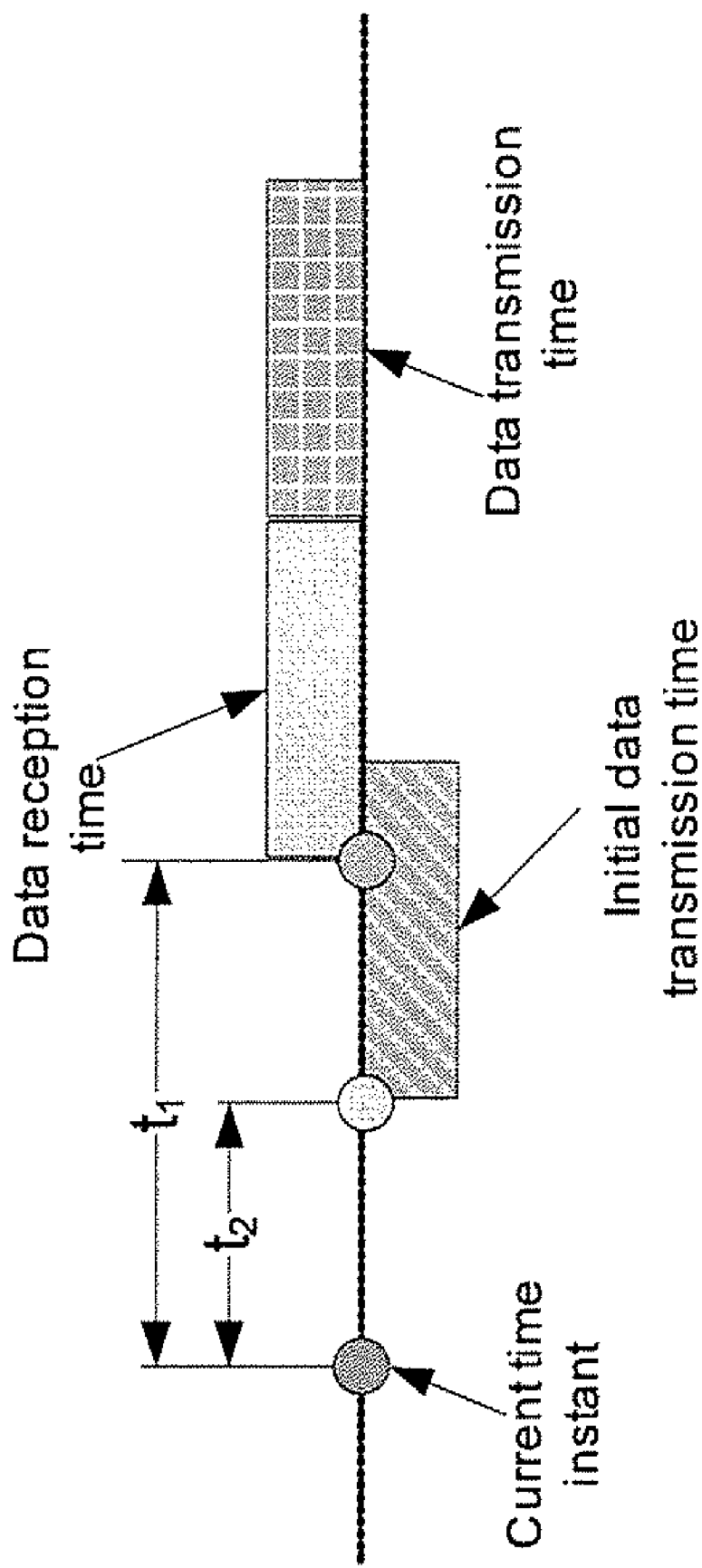
FIG. 2B illustrates a second example of conditions used to determine the start time of the next transmission by the transmitting STA according to at least one embodiment.

For instance, let t1 be the minimum time of next data reception by the transmitting STA 100A (referred to here as the transmitter T) and t2 be the time of the start of the next service period (but not yet signaled), then the following conditions may be used to determine the start time of the next transmission by the transmitting STA 100A according to at least one embodiment:
If (t1<=t2) then set t2=Max(t2, t1+data reception time by STA 100A), (see FIG. 2A).
If (t1>t2) then
If ((t2+data transmit time)>t1+data reception time by STA 100A) then
t2=t1+data reception time by STA 100A (see FIG. 2B).

This condition insures that the transmitting STA 100A is not busy transmitting data to its receivers, until the expiration of its data reception time (t1+data reception time by STA 100A).

In yet another embodiment, the transmitting STA 100A having multiple direct links with receiver stations, may overlap corresponding service periods towards different receivers in order to provide:
a) multicast data delivery to the receivers, or
b) controlled data delivery towards the transmitter station from receiver stations, for example, by using a Power Save Multi Poll (PSMP) mechanism.

In embodiments, the power save states of the transmitting STA 100A and the receiving STA 100B in the direct data transfer link 110 are readily aligned with the power save states required by the access point (AP) 50, since the direct data transfer link 110 is operated in the same frequency channel as the infrastructure BSS 70. In other embodiments where the direct data transfer link 110 may be operated in a different frequency channel from that of the infrastructure BSS 70, alignment of the power save states for the direct data transfer link 110 might be performed only when both STA 100A and STA 100B are in power save mode for the AP.

Figure 1C:
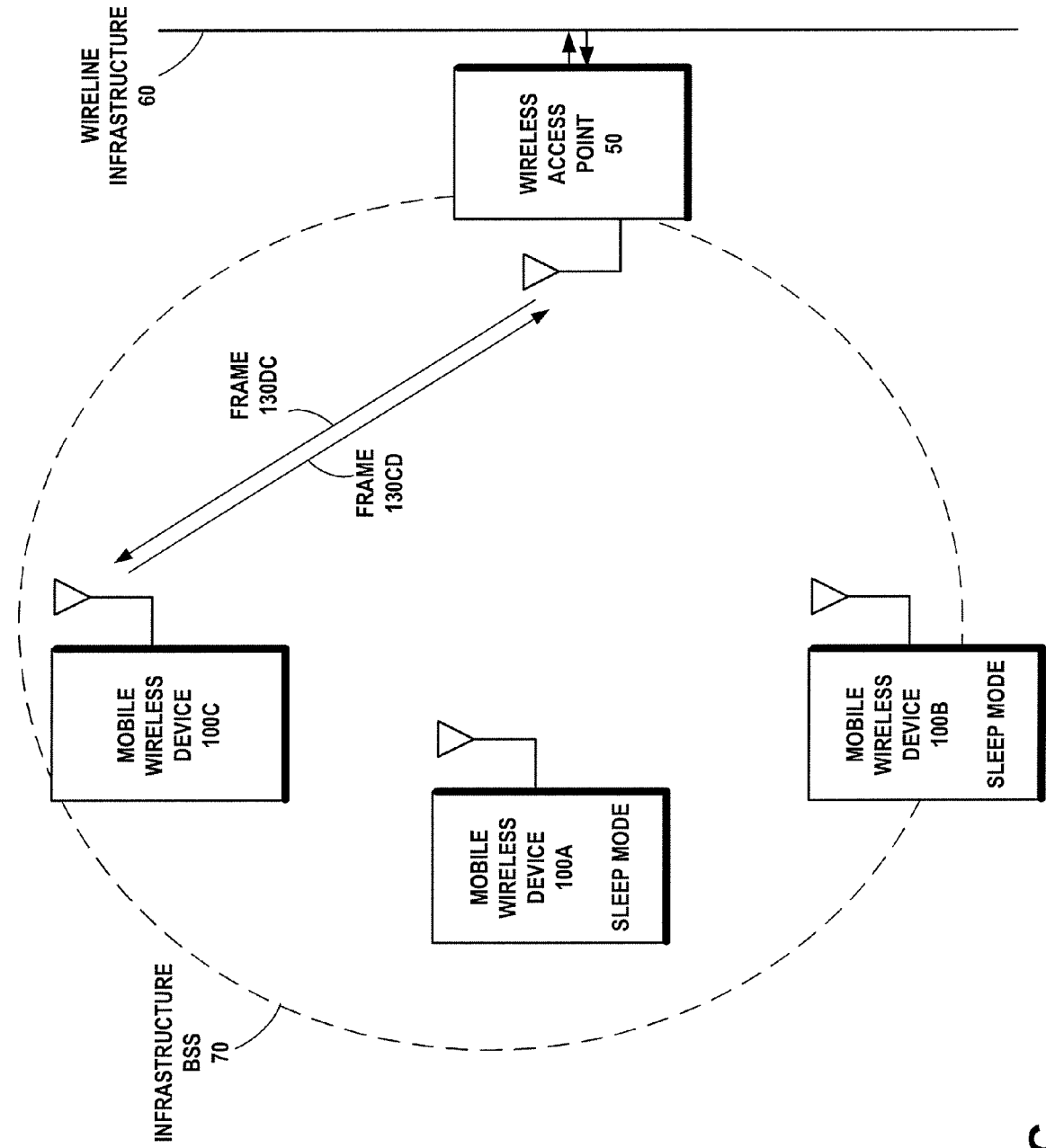
FIG. 1C is an example embodiment network diagram of the infrastructure BSS network of FIG. 1A, showing both the transmitting STA and the receiving STA in the power save mode over the direct data transfer link.

FIG. 1C is an example embodiment network diagram of the infrastructure BSS network 70 of FIG. 1A, showing both the transmitting STA 100A and the receiving STA 100B in the power save mode over the direct data transfer link 110. The STAs 100A and 100B may be in the sleep mode with respect to the direct data transfer link 110, but most likely the Access point (AP) 50 with which they are associated will not know that they are in the sleep mode with respect to the direct data transfer link 110.

Figure 1D:
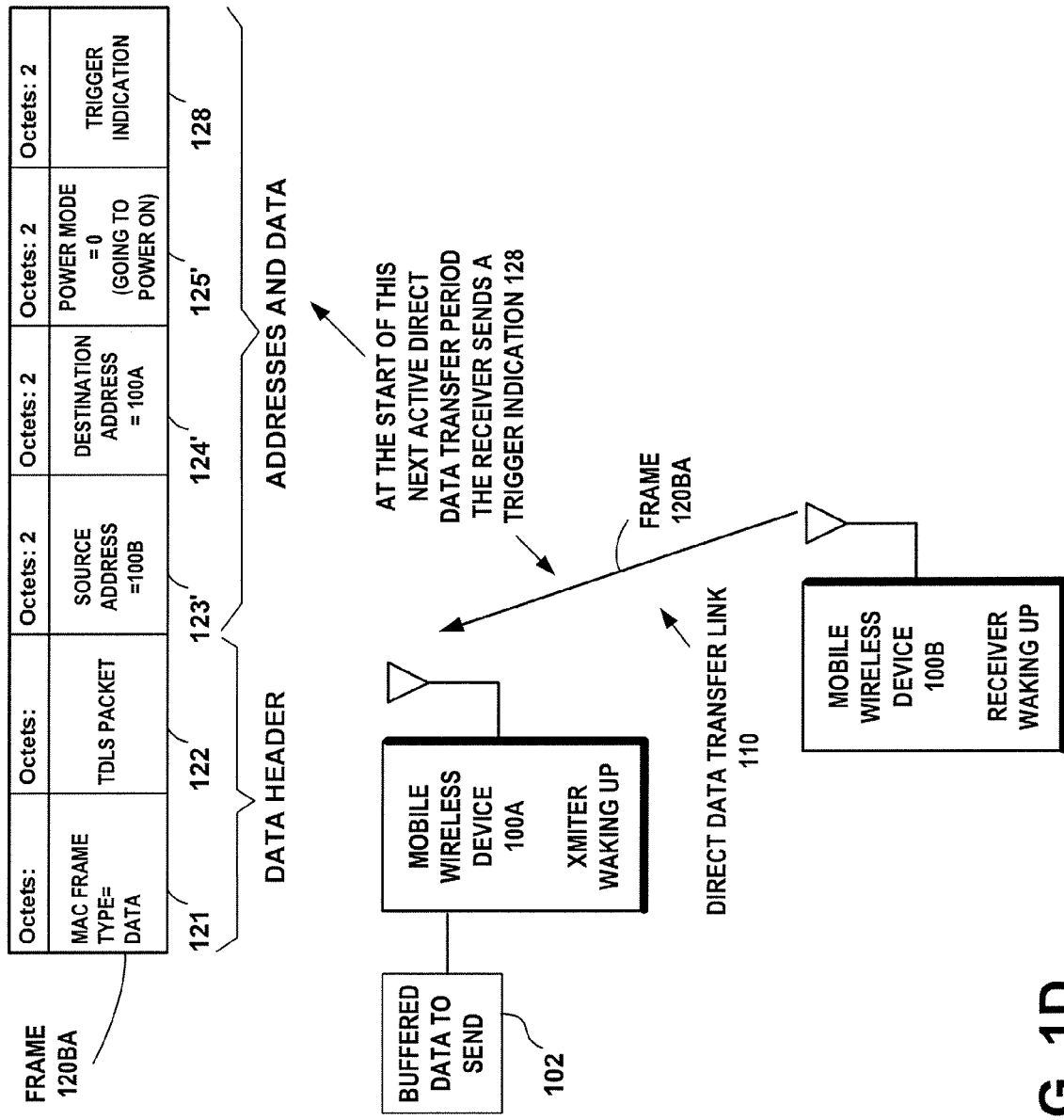
FIG. 1D is an example when the next active direct data transfer period, service period or session is about to start, showing the receiving STA sending a trigger indication to the transmitting STA over the direct data transfer link according to at least one embodiment.

FIG. 1D is an example illustration of a situation when the next active direct data transfer period is about to start according to at least one embodiment. When the next active direct data transfer period is about to start, the receiving device STA 100B sends a trigger signal 128 in frame 120BA based on the indication in the specified time field 126 it received in frame 120AB from the transmitting device STA 100A specifying when the next active direct data transfer period will start. The trigger signal 128 in frame 120BA indicates that the next period is about to start, so that the transmitting device STA 100A can start transmitting data to the receiving device STA 100B via the direct data transfer link 110. The trigger signal in frame 120BA may be sent over the direct data transfer link 110 to the transmitting mobile wireless device STA 100A. Alternately, as shown in FIG. 8B, trigger signal may be sent in trigger frames 130BD and 130DA through the access point (AP) wireless device 50, or through any other wireless device, to the transmitting mobile wireless device STA 100A.

FIG. 1D shows the receiving STA 100B sending the trigger indication 128 in the frame 120BA to the transmitting STA 100A over the direct data transfer link 110, confirming to the transmitting STA 100A that the receiving STA 100B has awakened, so that the transmitting STA 100A may resume transmitting the buffered data 102 to the receiving STA 100B over the direct data transfer link 110. In this manner STA 100A and STA 100B may coordinate returning from the power save mode over the direct data transfer link. FIG. 1D shows an example of the trigger frame 120BA as a MAC frame including a header portion and an address and data portion. The example header portion includes a field 121 indicating that the frame is a data frame and a field 122 that indicates it is a Tunneled Direct Link Setup (TDLS) packet. The example addresses 123' and 124' indicate the STA 100B is the sending station and STA 100A is the destination station. The example fields 125', and 128 indicate the next power mode to be the power-on state, and the trigger indication, respectively. It should be noted that the FIG. 1D is only an example and other frame formats may be used without departing the scope of the present application.

In another example embodiment, there can be a timeout interval specified for the transmitting STA 100A waiting for a trigger frame 120BA from the receiving STA 100B. For example, such a timeout interval may be a function of the next target beacon transmission time (TBTT) and/or End_time (where End_time is a time after which transmitting station STA 100A is no longer available for receiving station STA 100B). The timeout interval could be estimated as min(TBTT, End_time).

In case there was no indication that stations are awake during a timeout interval, they may switch to another band common to both stations or switch the transmission over the common node path 115 that includes the access point 50 or any other wireless station.

Figure 1E:
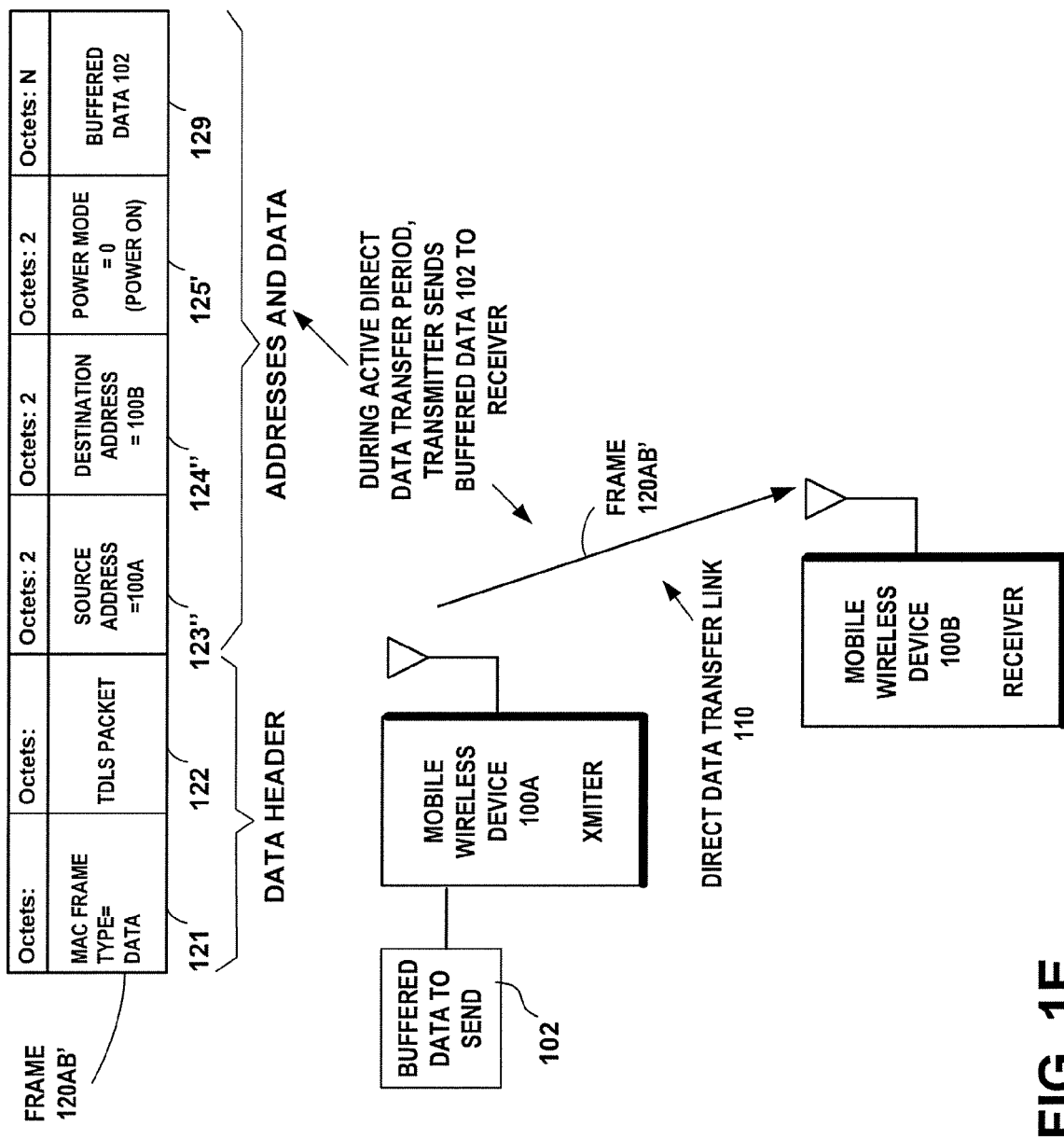
FIG. 1E is an example after the next active direct data transfer period, service period or session has started, showing the transmitting STA has resumed transmitting the buffered data to the receiving STA over the direct data transfer link according to at least one embodiment.

FIG. 1E is an example illustration of a situation after the next active direct data transfer period or service period has started according to at least one embodiment, showing the transmitting STA 100A has resumed transmitting the buffered data 102 to the receiving STA 100B over the direct data transfer link 110. FIG. 1E shows an example of the data frame 120AB' as a MAC frame including a header portion and an address and data portion. The example header portion includes a field 121 indicating that the frame is a data frame and a field 122 that indicates it is a Tunneled Direct Link Setup (TDLS) packet. The example addresses 123" and 124" indicate the STA 100A is the sending station and STA 100B is the destination station. The example fields 125' and 128 indicate the next power mode to be the power-on state, and the buffered data 102, respectively. FIG. 1E is only an example and other frame formats may be used.

Figure 1F:
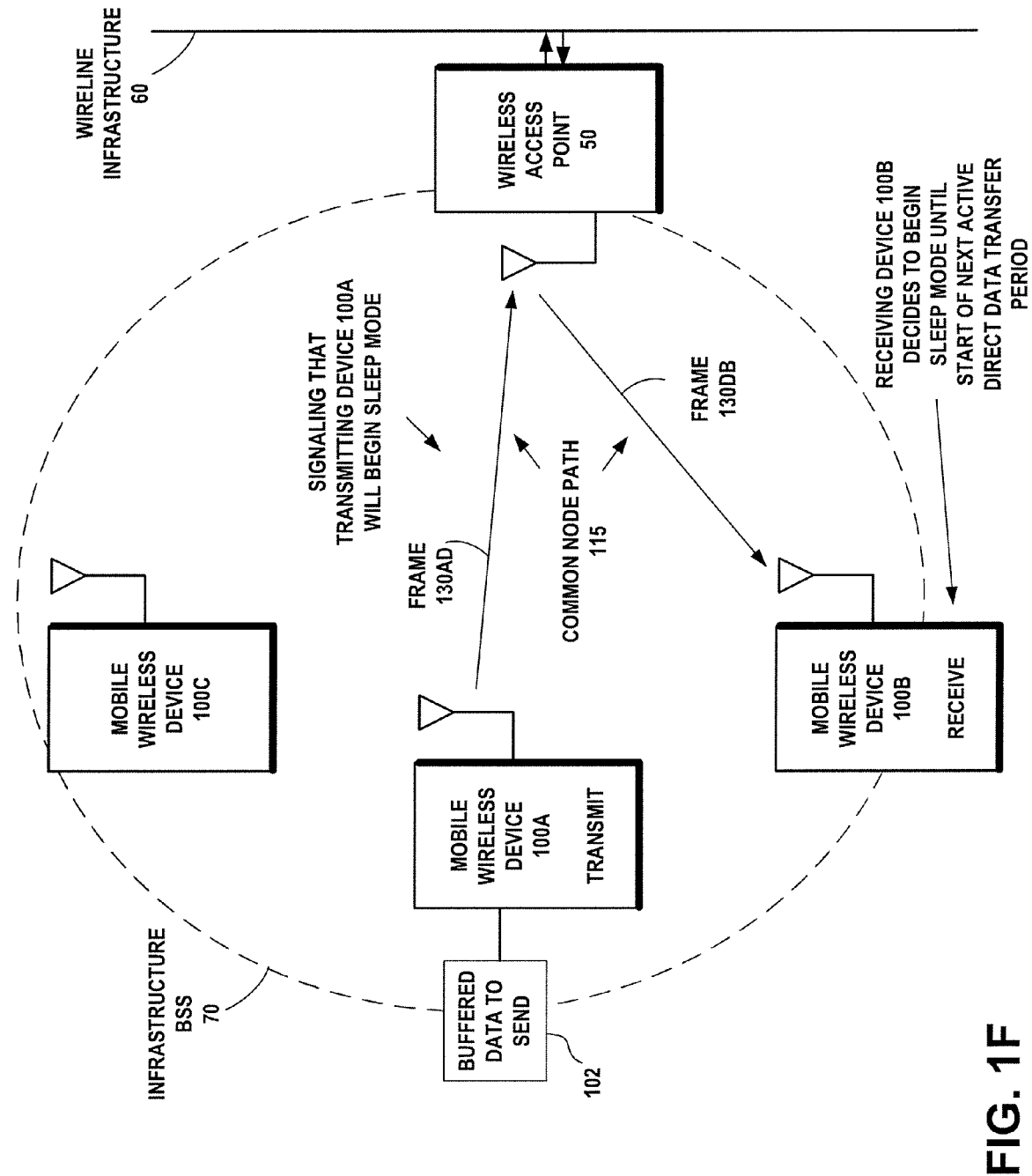
FIG. 1F is an alternate example of the initiation of a power save mode operation between the STAs over the common node path through the access point (AP), according to at least one embodiment.

FIG. 1F is an alternate example embodiment of the initiation of a power save mode operation between the STA 100A and the STA 100B over the common node path 115 through the access point (AP) 50, according to at least one embodiment. This example embodiment is applicable to method, apparatus and computer program products. Prior to the transmitting mobile wireless device STA 100A entering the power save mode, it inserts into a message in the frame 130AD that it transmits to the receiving mobile wireless device STA 100B, a specified time field to indicate when a next active direct data transfer period will start, so that the devices STA 100A and STA 100B can remain in power save mode in the direct data transfer link 110 until that time. The value of the time field is set to the next "wakeup time". The frame 130AD may be, for example, the last message that is transmitted by the transmitting mobile wireless device STA 100A. The message may be, for example, the last message that is transmitted by the transmitting mobile wireless device in the final frame, for instance where the frame has the End Of Service Period (EOSP) bit set to 1 instead of 0. The frame 130AD may be sent through the access point (AP) wireless device 50 and forwarded in frame 130 DB to the receiving mobile wireless device STA 100B. The specified time in the message indicates to the receiving device STA 100B when the two devices may start a next active direct data transfer period, service period or session, for example, to transfer data or to complete an operation between two devices over the direct data transfer link 110.

In embodiments, the signaling between the transmitting STA 100A and the receiving STA 100B over the direct data transfer link 110 enables the transmitting STA 100A and the receiving STA 100B to enter into and return from the power save mode for the direct data transfer communication link 100. The embodiments enable two mobile wireless devices (STAs) 100A and 100B to share a common view of the time intervals when they need to be available for the beginning of the service period for direct data transfer. Neither of the mobile wireless devices (STAs) 100A and 100B needs to be available all the time, as is necessary in the legacy 802.11 access point (AP). Instead, the mobile wireless devices (STAs) 100A and 100B may directly signal their availability to each other. After that, the two mobile wireless devices (STAs) 100A and 100B handle the service period and complete it.

In embodiments where there is bi-directional data transfer between the transmitting STA 100A and the receiving STA 100B over the direct data transfer link 110, the STAs may start data transmission in the service period after:
  a) STAs at both end points send a trigger frame 120BA (reception of a trigger frame at any end point implies that recipient station deletes its pending trigger frame to the originator of the received trigger frame), or
  b) STA being the next intended receiver sends a trigger frame, or
  c) transmitting STA is aware that the receiver STA is awake during scheduled service period, implicit transmission.

In case a) and b) a successful transmission and reception of an acknowledgement to the trigger frame is sufficient to signal to other peer STAs that the transmitting STA 100A and the receiving STA 100B over the direct data transfer link 110 are awake. The successful transmission and reception of the acknowledgement to the trigger frame also initiates the start of next active direct data transfer period or service period.

In another embodiment, data transmission may start after receiving a trigger frame from the receiving station over the common path through the AP 50, in the frequency used in the direct link or other frequency common with the AP, where the AP role may include:

a) forwarding the packet to the transmitting station, or b) enhanced packet forwarding where the AP is aware of existing direct communication (e.g. use of the highest priority for forwarded packet or placing forwarded packet to the head of the queue)

Figure 3:
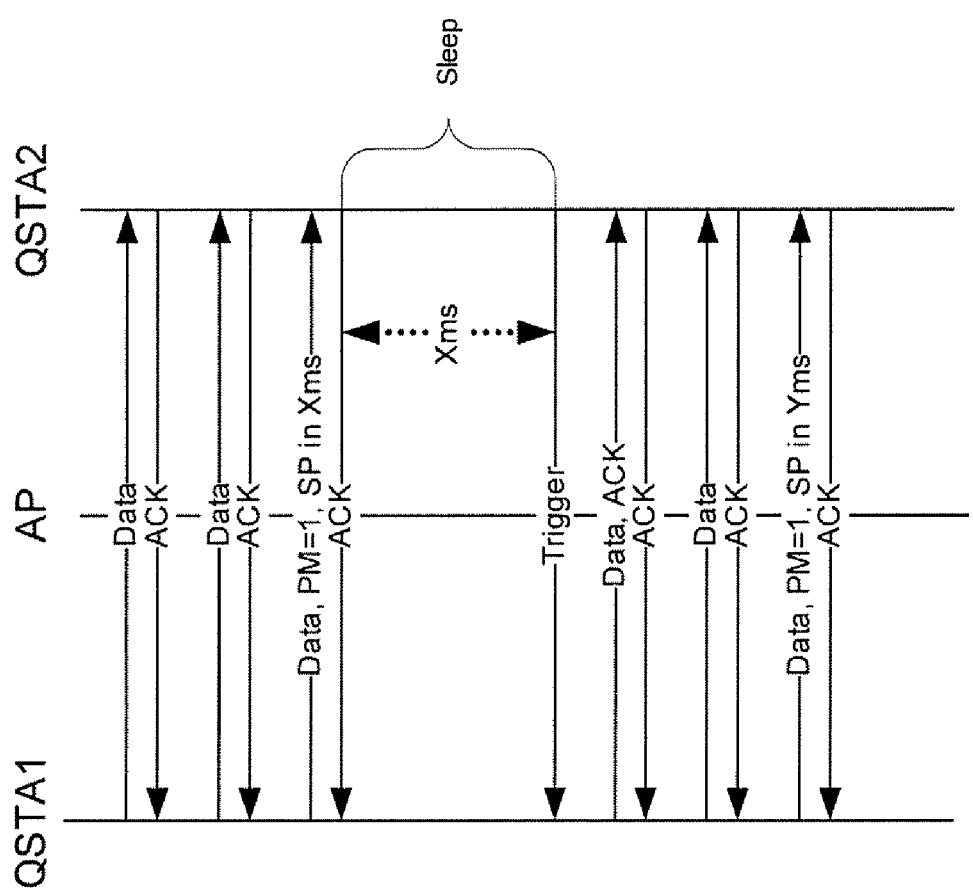
FIG. 3 is an example signaling diagram unidirectional data transmission according to at least one embodiment.

The example signaling diagram shown in FIG. 3 applies the above description relating to embodiments relating to unidirectional transmission. The diagram assumes that STA1 is sending data to STA2 over a direct data transfer link. After transmitting few packets STA 1 sends the last packets from its buffer and at the same time sets its power mode (PM) bit to 1 (indicating it is going to the power save mode) and specifies when the receiver can expect the next packet (in Xms). On the reception of this packet, STA2 decides that it can go to into the power save mode, itself, for the Xms time and thus sends an ACK frame to STA1 with the PM bit set to 1. After the time Xms occurs, both stations wake up and STA2 transmits a trigger frame to STA1 to check whether there is any frame of data buffered for it. Knowing that STA2 is awake, from having received trigger frame, and knowing that STA2 is ready to receive packets, STA1 starts transmission. When there are no more buffered packets in STA1, the process repeats.

Figure 4:
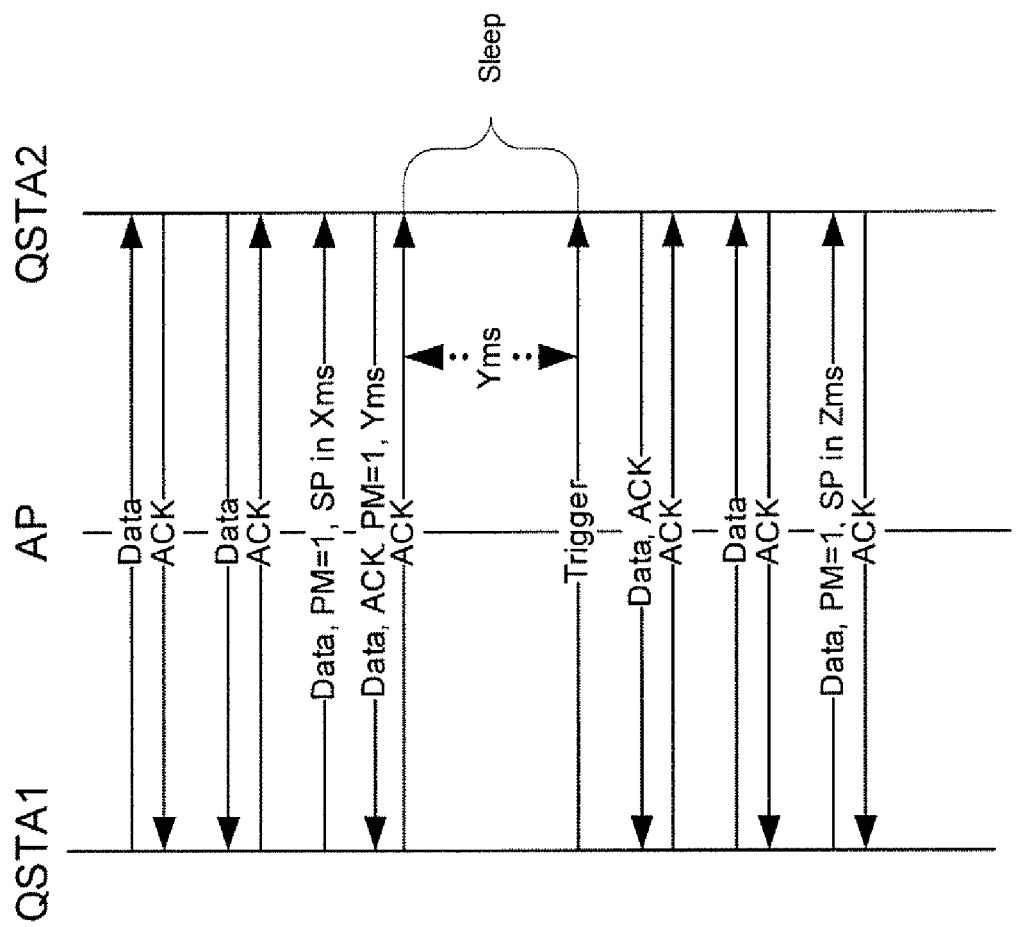
FIG. 4 is an example signaling diagram bidirectional transmission according to at least one embodiment.

The example signaling diagram shown in FIG. 4 applies the above description relating to embodiments relating to bidirectional traffic exchange. When both stations empty their buffers, they may negotiate when the next active direct data transfer period or service period should start, based on the above description. In FIG. 4, it is shown that STA1 proposes a next service period (SP) in Xms. However, STA2, due to its traffic pattern, proposes an alternate value of Yms, where Yms<Xms in this example. Therefore STA1 is the intended receiver for the next packet, and hence applying rule b) it sends a trigger frame to STA2 after Yms. When STA2 receives the trigger frame, both stations may start their traffic exchange. When the buffers are depleted in both stations, the process repeats. In embodiments, STA2 could buffer data for some interval, if delay is not a limiting factor.

Figure 5:
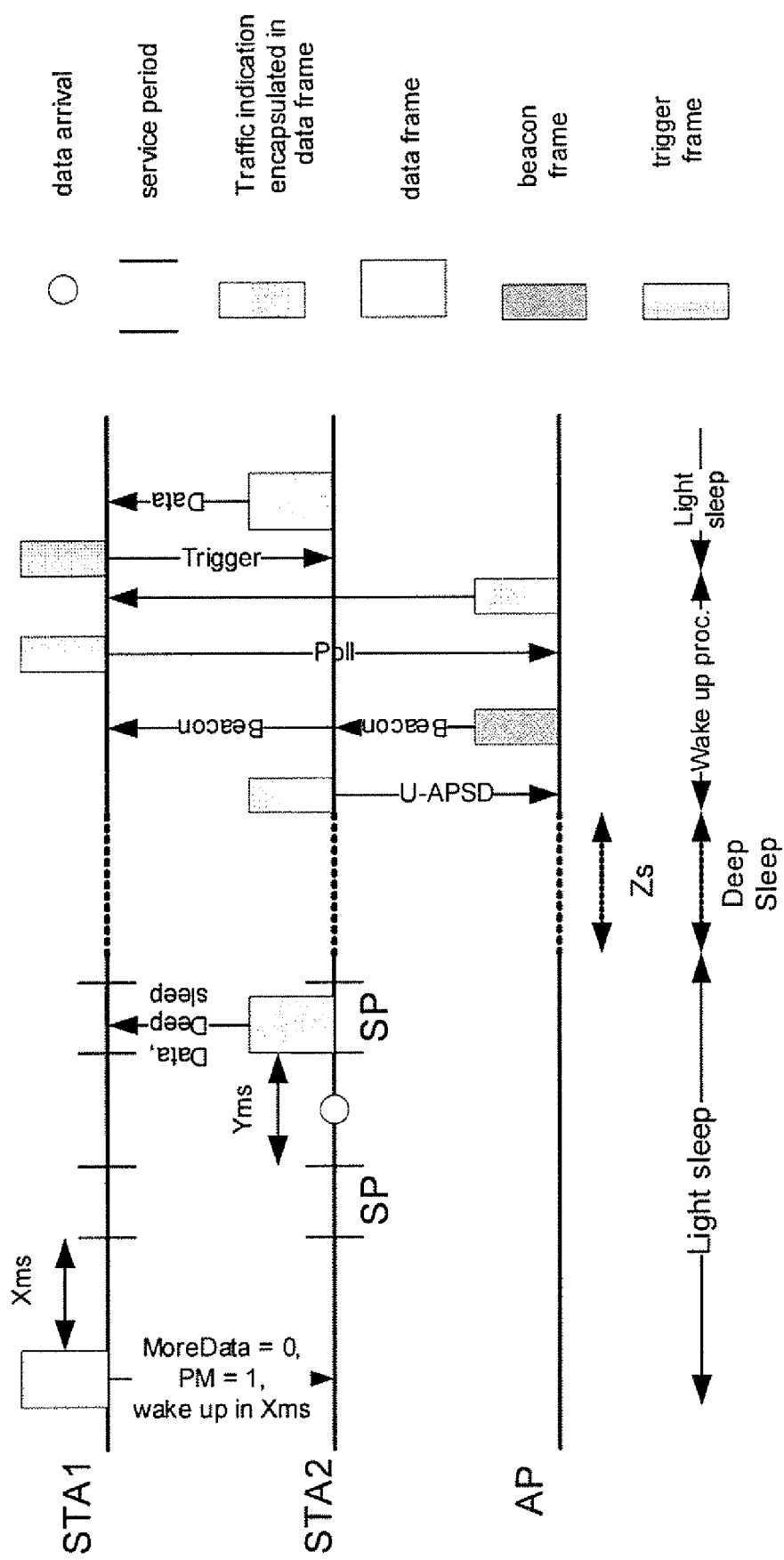
FIG. 5 illustrates an example of light sleep, deep sleep and link activation according to at least one embodiment.

The example signaling diagram shown in FIG. 5 illustrates light sleep and deep sleep. In an example embodiment, when a mobile wireless device STA1 conducting a service in a direct data transfer link, enters the power save mode for Xms time, it is in a light sleep state. When the service ends, the mobile wireless device STA1 may go into deep sleep state Zs. Deep sleep indicates that the direct link is inactive, but the credentials for the link between the first device STA1 and second device STA2 are still valid and hence could be used with the next service. Thus, for the next service between the first and second devices STA1 and STA2, no link set up is required and only activation of the direct data transfer link is needed. The activation procedure uses the U-APSD packet delivery mechanism between the two mobile wireless devices STA1 and STA2 in the same infrastructure BSS through the access point (AP). For instance, if the second device STA2 wants to start a new service with the first device STA1, it sends a traffic indication map (TIM) encapsulated in a data frame to the first device STA 1. The first step is the second device STA2 uses the U-APSD mechanism and sends the encapsulated data to the access point (AP). The access point (AP) then performs normal packet delivery to the first device STA1, so the AP indicates in its beacon frame that there is a packet for the first device STA1. Consequently, the first device STA1 transmits a poll frame to the AP to retrieve the encapsulated data containing the traffic indication map (TIM). The first device STA1 reads the traffic indication map (TIM) and then sends a trigger frame to the second device STA2 over the direct data transfer link to receive the data packets buffered for it in the second device STA2. The second device STA2 transmits the data packets to the first device STA 1 over the direct data transfer link.

Figure 6:
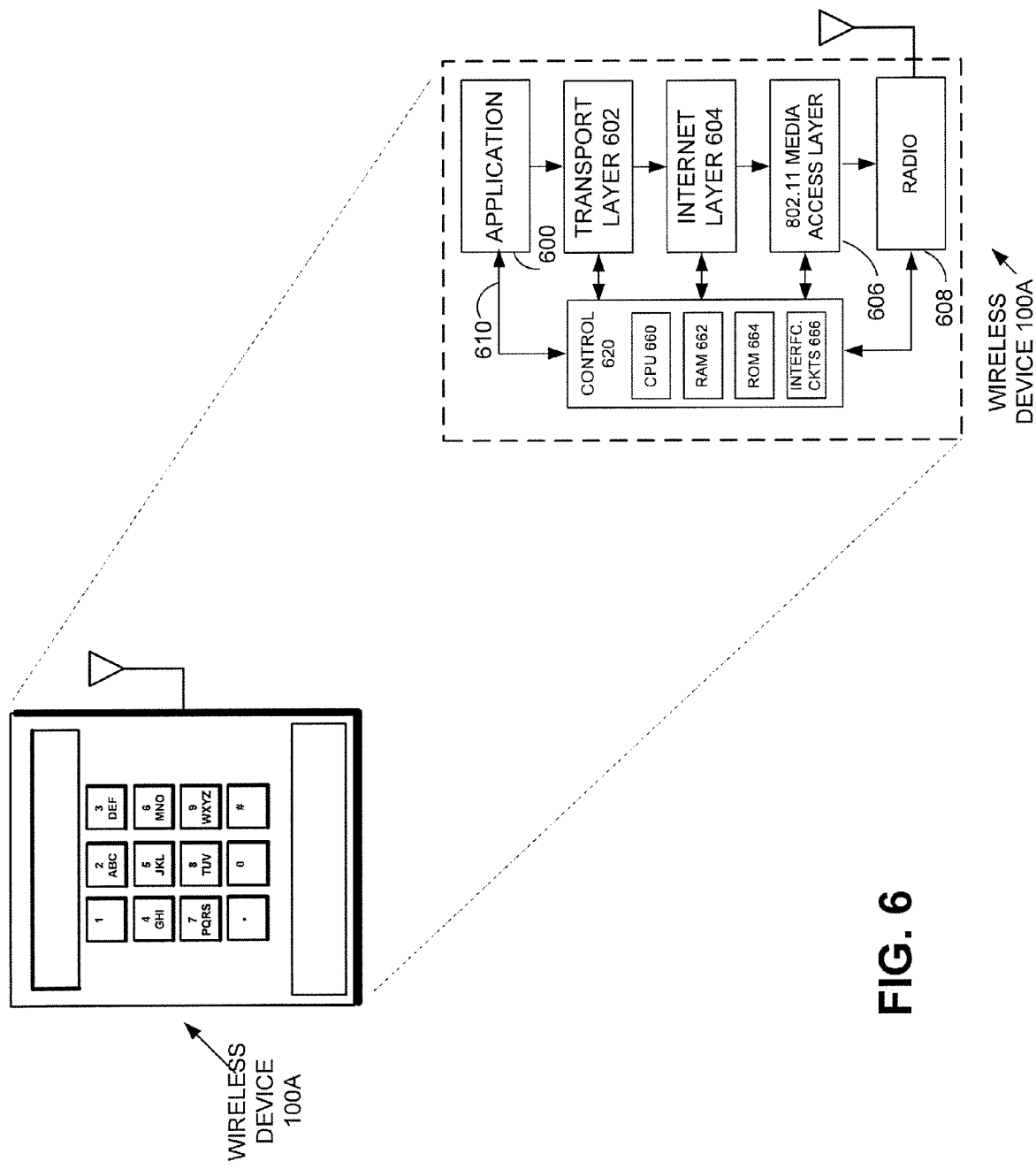
FIG. 6 illustrates an external view and a functional block diagram of an example embodiment of the mobile wireless device (STA).

FIG. 6 illustrates an external view and a functional block diagram of an example embodiment of the mobile wireless device (STA) 100A. The mobile wireless device (STA) 100A may be a mobile communications device, PDA, cell phone, laptop or palmtop computer, or the like. The mobile wireless device (STA) 100A includes a control module 620, which includes a central processing unit (CPU) 660, a random access memory (RAM) 662, a read only memory (ROM) 664, and interface circuits 666 to interface with the radio transceiver 608, battery and other power sources, key pad, touch screen, display, microphone, speakers, ear pieces, camera or other imaging devices, etc. in the devices 100A, 100B, and 100C. The RAM 662 and ROM 664 can be removable memory devices such as smart cards, SIMs, WIMs, semiconductor memories such as RAM, ROM, PROMS, flash memory devices, etc. The mobile wireless device (STA) 100A includes an Internet protocol stack that includes the user's application program 600 at the top, the Transmission Control Protocol (TCP) transport layer 602, and the Internet Protocol (IP) layer 604, the 802.11 Media Access Control (MAC) layer 606, and the radio transceiver physical layer 608 at the bottom of the protocol stack. The 802.11 MAC layer provides functionality to allow reliable data delivery for the upper layers over the wireless medium. The 802.11 MAC layer uses the IEEE 802.11 TGz standard, which includes the feature of Direct Link Setup.

The control module 620, internet protocol stack layers 602, 604, 606, and/or application program 600 can be embodied as program logic stored in the RAM 662 and/or ROM 664 in the form of sequences of programmed instructions which, when executed in the CPU 660, carry out the functions of the disclosed embodiments. The program logic can be delivered to the writeable RAM, PROMS, flash memory devices, etc. 662 of the mobile wireless device (STA) 100A from a computer program product or article of manufacture in the form of computer-usable media such as resident memory devices, smart cards or other removable memory devices, or in the form of program logic transmitted over any transmitting medium which transmits such a program. Alternately, they can be embodied as integrated circuit logic in the form of programmed logic arrays or custom designed application specific integrated circuits (ASIC). The radio 608 in mobile wireless device (STA) 100A can be separate transceiver circuits or alternately, the radio 608 can be a single radio module capable of handling one or multiple channels in a high speed, time and frequency multiplexed manner in response to the control module 620.

Figure 7:
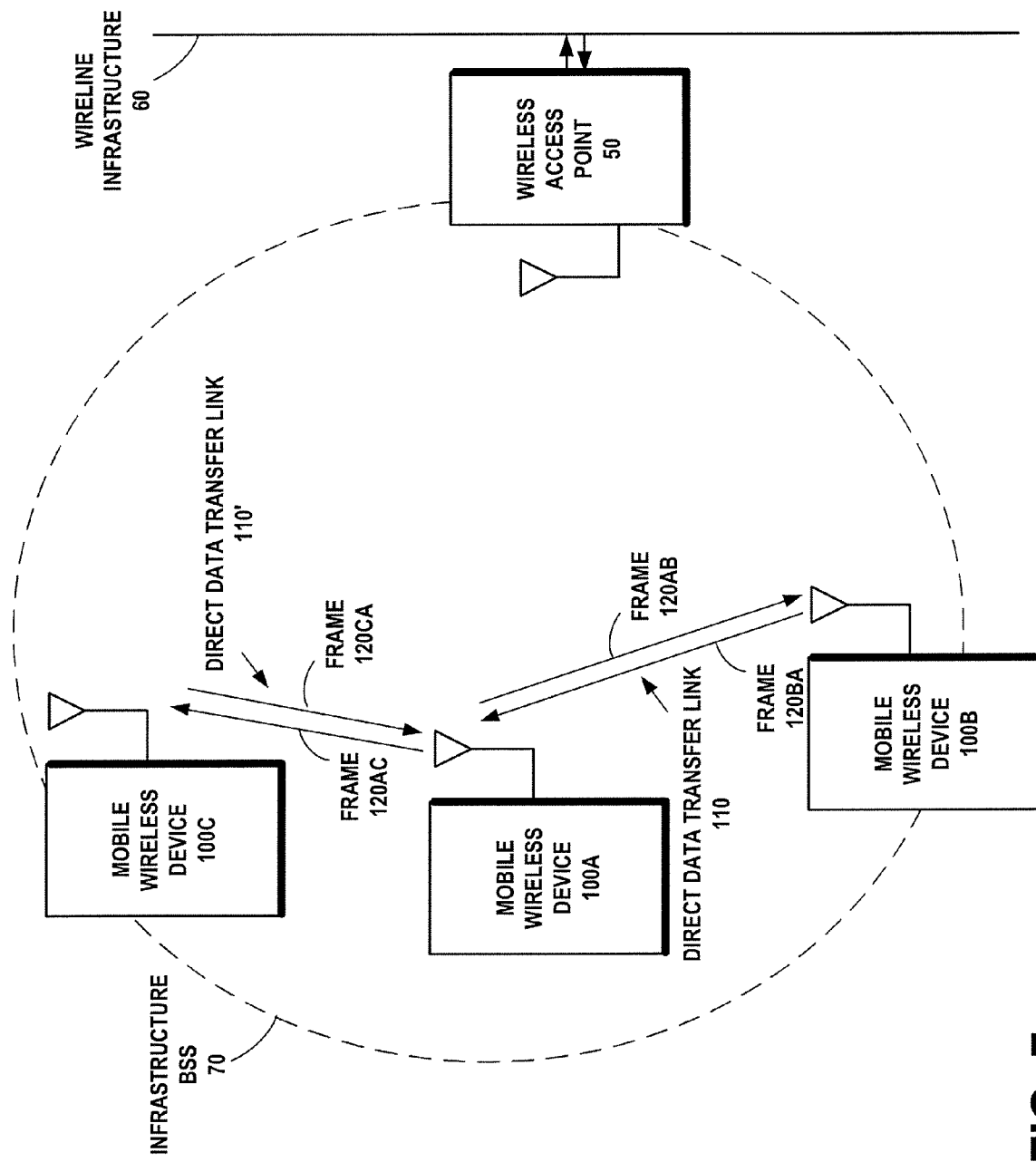
FIG. 7 is an example network diagram of an infrastructure BSS network 70 according to at least one embodiment, with a mobile wireless device (STA) 100A communicating over a first direct data transfer link 110 with a second mobile wireless device (STA) 100B and communicating over a second direct data transfer link 110' with a third mobile wireless device (STA) 100C, the three mobile wireless devices (STAs) 100A, 100B, and 100C being associated with the access point (AP), which performs wireless-to-wired bridging from the STAs 100A, 100B, and 100C to the wired infrastructure network 60.

FIG. 7 is an example network diagram of an infrastructure BSS network 70 according to at least one embodiment, with a mobile wireless device (STA) 100A communicating over a first direct data transfer link 110 with a second mobile wireless device (STA) 100B and communicating over a second direct data transfer link 110' with a third mobile wireless device (STA) 100C, the three mobile wireless devices (STAs) 100A, 100B, and 100C being associated with the access point (AP), which performs wireless-to-wired bridging from the STAs 100A, 100B, and 100C to the wired infrastructure network 60. The mobile wireless device (STA) 100A in the infrastructure BSS 70 may coordinate entering into and returning from the power save mode for each direct data transfer link 100 and 100'.

If mobile wireless device (STA) 100A in FIG. 7 has data to transmit to each of the other mobile wireless devices (STAs) 100B and 100C, the transmitting mobile wireless device (STA) 100A can specify to each receiving device (STAs) 100B and 100C substantially the same starting time when the next active direct data transfer period or service period will start, to reduce the number of on/off transitions so as to minimize power consumption. The last message frame 120AB that the transmitting STA 100A may transmit in a service period on the direct data transfer link 110, indicating to STA 100B that it intends to begin the power save or sleep mode and the specified time when the next service period will start, which may enable the receiving STA 100B to decide whether it wants to coordinate beginning its power save mode for the same time as the transmitting STA 100A and coordinate remaining in that sleep mode until that specified time occurs, when both STAs 100A and 100B should be awake. Similarly, the message frame 120CA that the transmitting STA 100A may transmit as a last message in a service period according to at least one embodiment on the direct data transfer link 110', indicating to STA 100C that it intends to begin the power save or sleep mode and the specified time when the next service period will start, which may enable the receiving STA 100C to decide whether it wants to coordinate beginning its power save mode for the same time as the transmitting STA 100A and coordinate remaining in that sleep mode until that specified time occurs, when both STAs 100A and 100C should be awake. In this manner STA 100A, STA 100B, and STA 100C may coordinate entering into and returning from the power save mode over the direct data transfer links 110 and 110'. The STAs STA 100A, STA 100B, and STA 100C may be in the sleep mode with respect to the direct data transfer links 110 and 110', but most likely the Access point (AP) 50 with which they are associated will not know that they are in the sleep mode.

If mobile wireless device (STA) 100A in FIG. 7 has data to transmit over a first direct data transfer link 110 to a second mobile wireless device STA 100B and mobile wireless device (STA) 100A receives an indication of a starting time when it will receive data over a second direct data transfer link 110' from a third mobile wireless device STA 100C in the infrastructure BSS 70, the first mobile wireless device STA 100A may specify substantially the same starting time to the second mobile wireless device STA 100B when the next service period will start over the first direct data transfer link 110, as was received in the indication from the third mobile wireless device STA 100C, in order to reduce the number of on/off transitions so as to minimize power consumption.

Figure 8A:
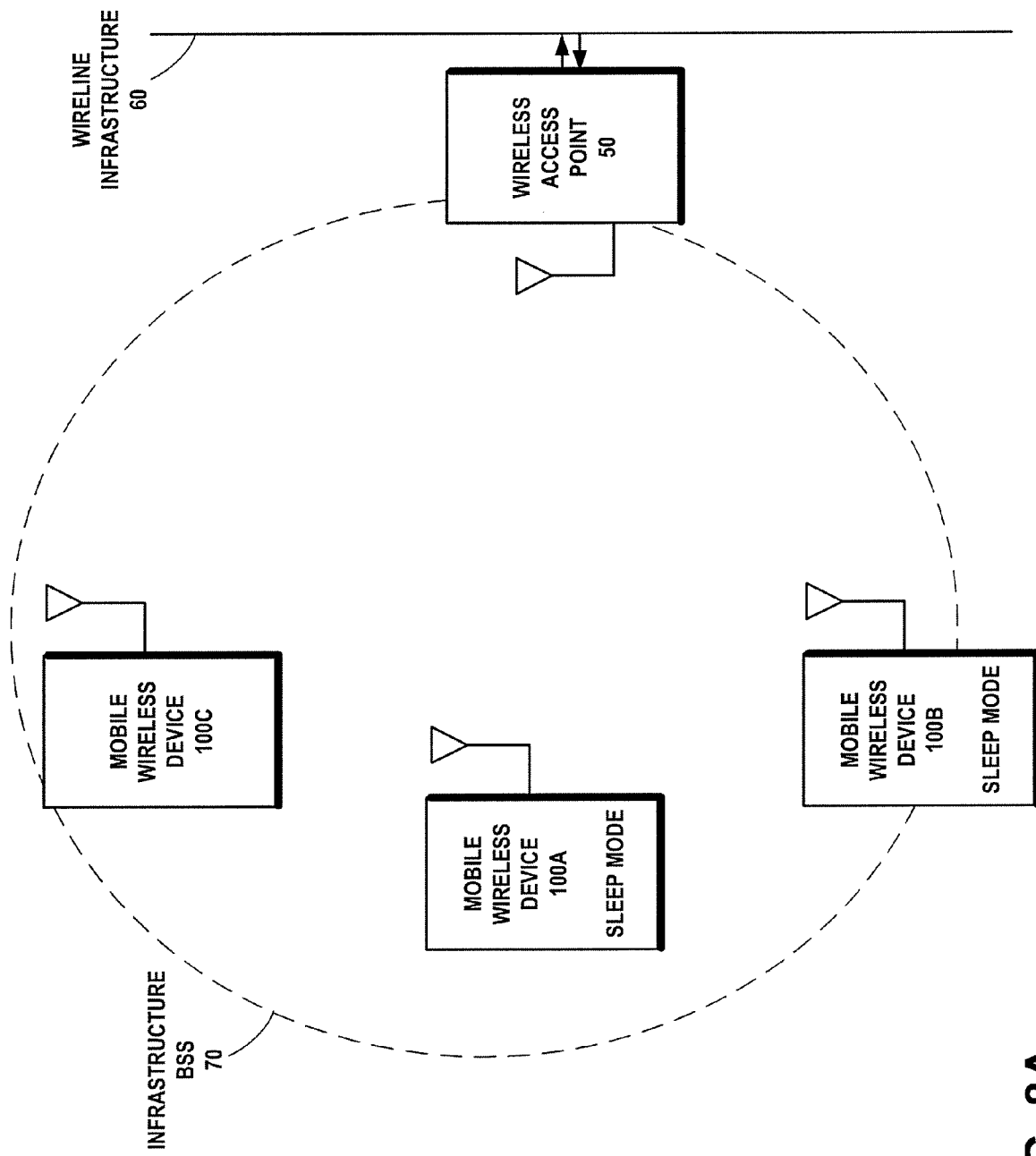
FIG. 8A is an example embodiment network diagram of the infrastructure BSS network of FIG. 1A, showing both the transmitting STA 100A and the receiving STA 100B in the power save mode over the direct data transfer link 110, according to at least one embodiment.
Figure 8B:
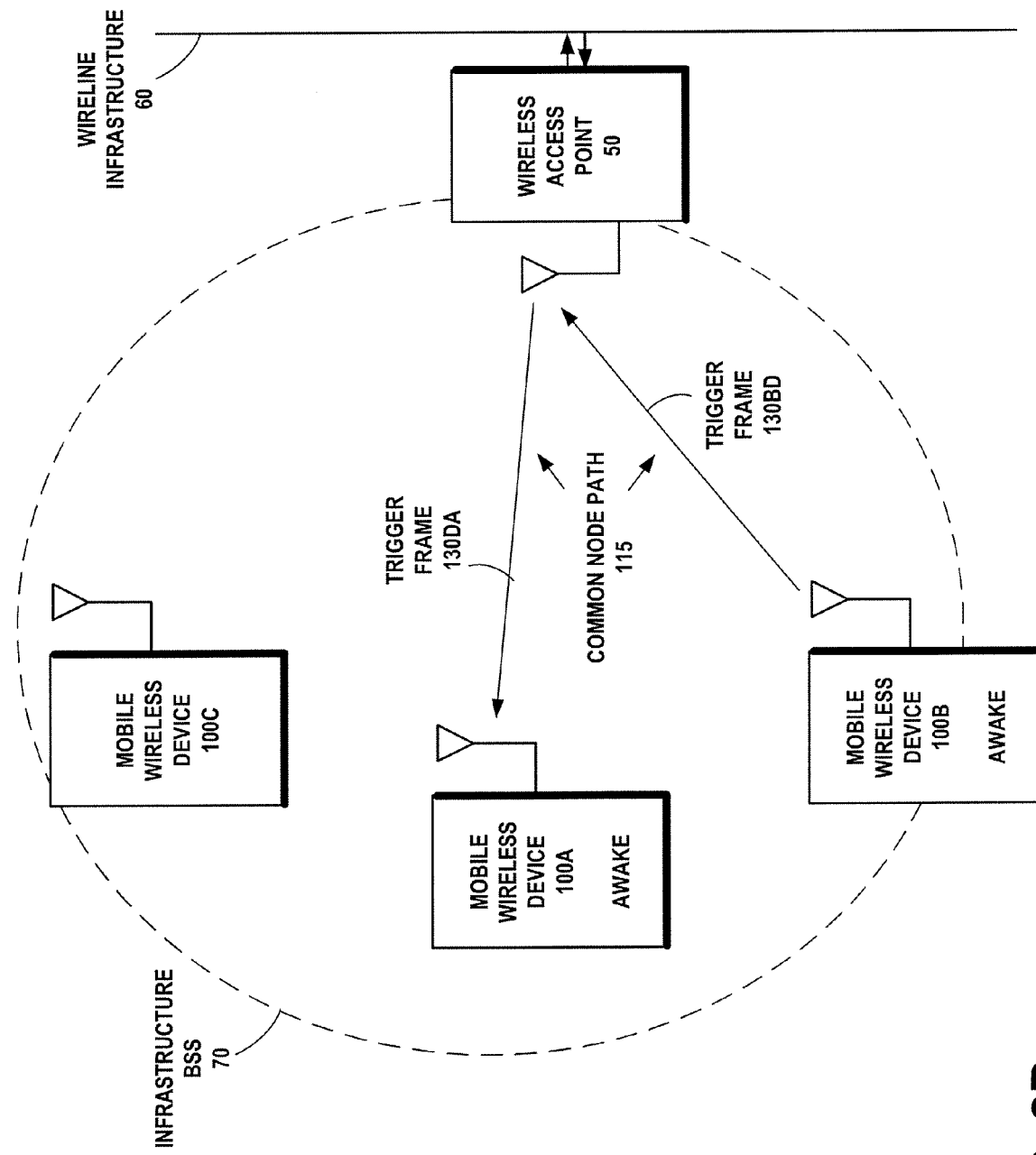
FIG. 8B shows an example of the infrastructure BSS network of FIG. 8A, when the next active direct data transfer period, service period or session is about to start, showing the receiving STA 100B sending a trigger indication in frame 130BD over the common node path 115 to the access point (AP) 50 for relaying the trigger indication in frame 130DA to the transmitting STA 100A over the common node path 115, according to at least one embodiment.

FIG. 8A is an example embodiment network diagram of the infrastructure BSS network of FIG. 1A, showing both the transmitting STA 100A and the receiving STA 100B in the power save mode over the direct data transfer link 110, according to at least one embodiment.

FIG. 8B shows an example embodiment of the infrastructure BSS network of FIG. 8A, when the next active direct data transfer period is about to start. This example embodiment is applicable to method, apparatus and computer program products. FIG. 8B shows the receiving STA 100B sending a trigger indication in frame 130BD over the common node path 115 to the access point (AP) 50 for relaying the trigger indication in frame 130DA to the transmitting STA 100A over the common node path 115, according to at least one embodiment. When the next active direct data transfer period is about to start, the receiving device STA 100B sends the trigger signal based on the indication in the specified time field it received from the transmitting device STA 100A specifying when the next active direct data transfer period will start. The trigger signal indicates that the next period is about to start, so that the transmitting device STA 100A can start transmitting data to the receiving device STA 100B via the direct data transfer link 110.

Figure 8C:
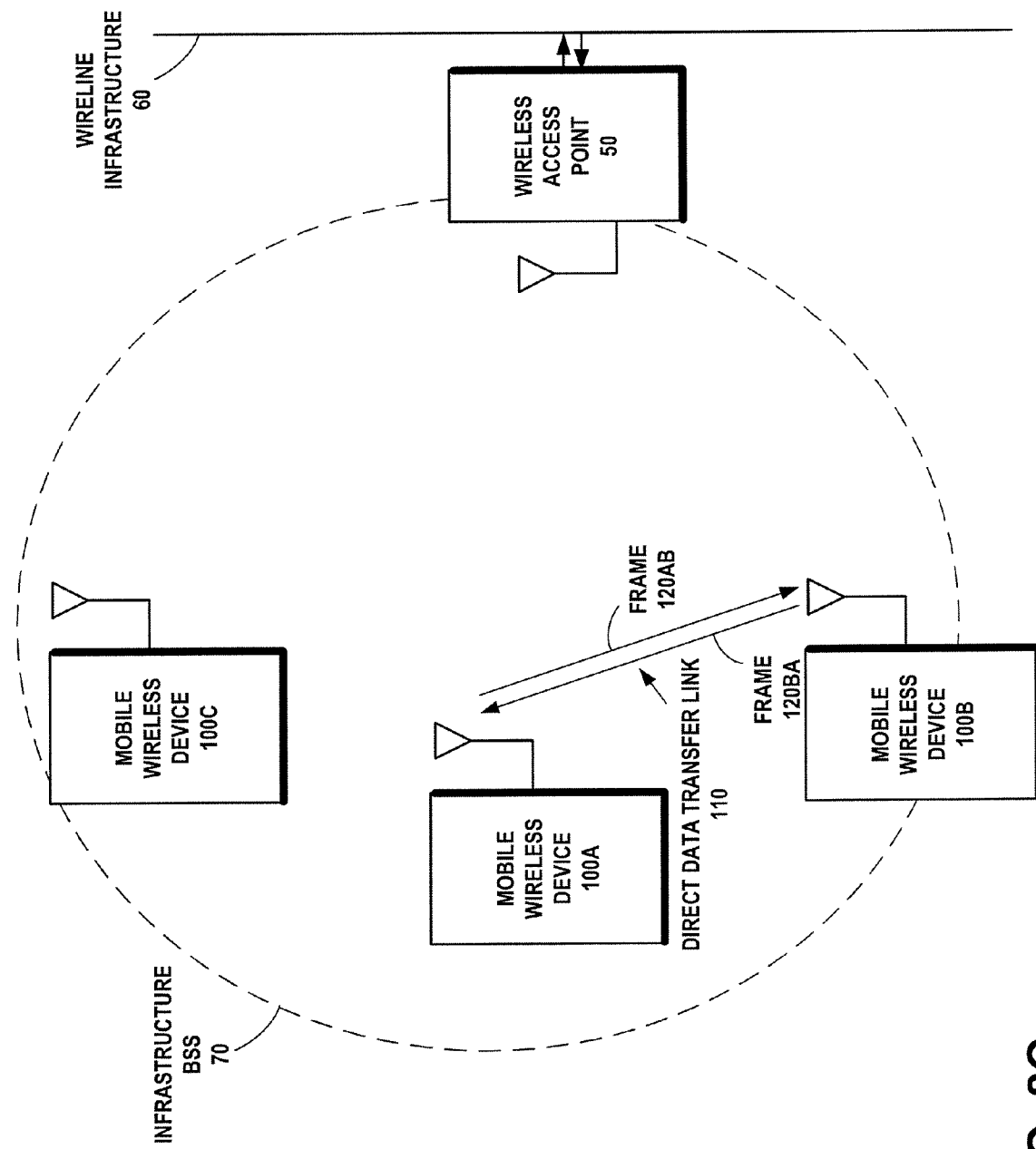
FIG. 8C shows an example of the infrastructure BSS network of FIG. 8B, after the next active direct data transfer period, service period or session has started, showing the transmitting STA 100A has resumed transmitting the buffered data in frame 120AB to the receiving STA 100B over the direct data transfer link 110, according to at least one embodiment.

FIG. 8C shows an example of the infrastructure BSS network of FIG. 8B, after the next active direct data transfer period or service period has started, showing the transmitting STA 100A has resumed transmitting the buffered data in frame 120AB to the receiving STA 100B over the direct data transfer link 110, according to at least one embodiment.

The resulting embodiments can be implemented with out any changes to the AP. The embodiments can be implemented to provide for power saving at STAs that are peer STAs on a direct data transfer link that is operating either in the same band as the AP or in a different band. Embodiments include light and deep sleep states, which reduce link establishment process to requiring only one packet exchange through the AP, instead of the previous three packets, which significantly reduces link creation time and energy consumption.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed in networks other than Wireless LAN networks.

What is claimed is:

1. A method, comprising:
   transmitting, by a transmitting mobile wireless device, an indication to a receiving mobile wireless device when a next active direct data transfer period will start so that the mobile wireless devices can remain in power save mode in a direct data transfer link until starting time of the period; and
   receiving from the receiving mobile wireless device, a trigger signal based on said indication, the trigger signal indicating that the next period is about to start, so that the transmitting mobile wireless device can start transmitting data to the receiving mobile wireless device via the direct data transfer link.

2. The method claim 1, wherein the two mobile wireless devices share a common view of time intervals when they need to be available for the beginning of next active direct data direct data transfer period.

3. The method claim 1, wherein neither of the mobile wireless devices needs to be available for the direct data transfer communication all the time.

4. The method claim 1, wherein the mobile wireless devices are members of an infrastructure basic service set (BSS), and coordinate entering into and returning from the power save mode over the direct data transfer link.

5. The method claim 1, wherein said transmitting mobile wireless device has data to send over a second direct data transfer link to a third mobile wireless device and said transmitting mobile wireless device specifies to said receiving mobile wireless device and said third mobile wireless device said starting time when the next active direct data transfer period will start so that said transmitting mobile wireless device, said receiving mobile wireless device, and said third mobile wireless device can align their power save modes.

6. The method claim 1, wherein said transmitting mobile wireless device has data to transmit over a first direct data transfer link to said receiving mobile wireless device and receives an indication of a starting time when it will receive data over a second direct data transfer link from a third mobile wireless device in an infrastructure basic service set (BSS), the transmitting mobile wireless device specifying substantially a same starting time to the receiving mobile wireless device when a next active direct data transfer period will start over the first direct data transfer link, to reduce a number of on or off transitions so as to minimize power consumption.

7. The method claim 1, which further comprises:
sending a traffic indication map (TIM) encapsulated in a data frame from the transmitting mobile wireless device to an access point, for indicating that there is a data packet buffered in the transmitting mobile wireless device for the receiving mobile wireless device; and
transmitting the data packet over the direct data transfer link to the receiving mobile wireless device after the access point has notified the receiving mobile wireless device that the transmitting mobile wireless device has a data packet buffered for the receiving mobile wireless device.

8. The method of claim 1, wherein said indication of when a next period will start is included in a last message transmitted by the transmitting mobile wireless device in a period in the direct data transfer link.

9. The method of claim 1, wherein the trigger signal is sent from the receiving mobile wireless device over the direct data transfer link to the transmitting mobile wireless device.

10. A device, comprising:
a transceiver in a mobile wireless device; and
a processor configured to control the operation of the transceiver to:
transmit an indication to another mobile wireless device when a next active direct data transfer period will start so that the mobile wireless devices can remain in power save mode in a direct data transfer link until starting time of the period; and
receive from the another mobile wireless device, a trigger signal based on said indication, the trigger signal indicating when the next period is about to start, so that transmitting data to the other mobile wireless device via the direct data transfer link can be initiated.

11. The device of claim 10, wherein said mobile wireless device operates according to the IEEE 802.11 communication protocol standards.

12. The device of claim 10, wherein said mobile wireless device is a member of an infrastructure basic service set (BSS), and coordinates entering into and returning from the power save mode over the direct data transfer link.

13. The device of claim 10, wherein said mobile wireless device has data to send over a second direct data transfer link to a third mobile wireless device and said mobile wireless device specifies to said another mobile wireless device and said third mobile wireless device said starting time when the next active direct data transfer period will start so that said mobile wireless device, said another mobile wireless device, and said third mobile wireless device can align their power save modes.

14. The device of claim 10, wherein said mobile wireless device has data to transmit over a first direct data transfer link to said another mobile wireless device and receives an indication of a starting time when it will receive data over a second direct data transfer link from a third mobile wireless device in an infrastructure basic service set (BSS), said mobile wireless device specifying substantially a same starting time to said another mobile wireless device when a next period will start over the first direct data transfer link, to reduce a number of on or off transitions so as to minimize power consumption.

15. The device of claim 10, wherein said processor is further configured to control when said mobile wireless device enters the power save mode to be followed by a resumption of a service, it enters in a light sleep state and when the service ends, said mobile wireless device enters deep sleep state.

16. The device of claim 15, wherein said deep sleep state indicates that the direct data transfer link is inactive, but credentials for the direct data transfer link remain valid and can be used for a next service.

17. The device of claim 16, wherein said processor is further configured to control:
sending of a traffic indication map (TIM) encapsulated in a data frame to an access point, for indicating that there is a data packet buffered in said mobile wireless device for said another mobile wireless device; and
transmitting of the data packet over the direct data transfer link to said another mobile wireless device after the access point has notified said another mobile wireless device that said mobile wireless device has a data packet buffered for it.

18. The device of claim 10, wherein said indication of when a next period will start is included in a last message transmitted by the mobile wireless device in a period in the direct data transfer link.

19. The device of claim 10, wherein the trigger signal is sent from the another mobile wireless device over the direct data transfer link to the mobile wireless device.

20. A computer program product, comprising:
a computer readable non-transitory medium configured to store program instructions, which when executed by a computer processor, perform the steps of:
transmitting, by a transmitting mobile wireless device, an indication to a receiving mobile wireless device when a next active direct data transfer period will start so that the mobile wireless devices can remain in power save mode in a direct data transfer link until starting time of the period; and
receiving from the receiving mobile wireless device, a trigger signal based on said indication, the trigger signal indicating that the next period is about to start, so that the transmitting mobile wireless device can start transmitting data to the receiving mobile wireless device via the direct data transfer link.

21. The computer program product of claim 20, wherein the mobile wireless devices operate under the IEEE 802.11 standard, to directly signal their availability to each other.

22. The computer program product of claim 20, wherein the mobile wireless devices are members of an infrastructure basic service set (BSS), and coordinate entering into and returning from the power save mode over the direct data transfer link.

23. The computer program product of claim 20, wherein said indication of when a next period will start is included in a last message transmitted by the transmitting mobile wireless device in a period in the direct data transfer link.

24. The computer program product of claim 20, wherein the trigger signal is sent from the receiving mobile wireless device over the direct data transfer link to the transmitting mobile wireless device.

25. An apparatus, comprising:
means for transmitting, by a transmitting mobile wireless device, an indication to a receiving mobile wireless device when a next active direct data transfer period will start so that the mobile wireless devices can remain in power save mode in a direct data transfer link until that time; and
means for receiving from the receiving mobile wireless device, a trigger signal based on said indication, the trigger signal indicating that the next period is about to start, so that the transmitting mobile wireless device can start transmitting data to the receiving mobile wireless device via the direct data transfer link.

26. A device, comprising:
a transceiver in a mobile wireless device; and
a processor in the mobile wireless device, configured to control the operation of the transceiver to:
receive an indication from an initiating mobile wireless device when a next active direct data transfer period will start so that the mobile wireless devices can remain in power save mode in a direct data transfer link until starting time of the period; and
send to the initiating mobile wireless device, a trigger signal based on said indication, the trigger signal indicating that the next period is about to start, so that the initiating mobile wireless device can start transmitting data via the direct data transfer link.

27. The device of claim 26, wherein said mobile wireless device operates according to the IEEE 802.11 communication protocol standards.

28. The device of claim 26, wherein said mobile wireless device is a member of an infrastructure basic service set (BSS), and coordinates entering into and returning from the power save mode over the direct data transfer link.

29. The device of claim 26, wherein said initiating mobile wireless device has data to send over a second direct data transfer link to a third mobile wireless device and said initiating mobile wireless device specifies to said mobile wireless device and said third mobile wireless device said starting time when the next active direct data transfer period will start so that said mobile wireless device, said initiating mobile wireless device, and said third mobile wireless device can align their power save modes.

30. The device of claim 26, wherein said initiating mobile wireless device has data to transmit over a first direct data transfer link to said mobile wireless device and receives an indication of a starting time when it will receive data over a second direct data transfer link from a third mobile wireless device in an infrastructure basic service set (BSS), said initiating mobile wireless device specifying substantially a same starting time to said mobile wireless device when a next period will start over the first direct data transfer link, to reduce a number of on or off transitions so as to minimize power consumption.

31. The device of claim 26, wherein said processor is further configured to control when said mobile wireless device enters the power save mode to be followed by a resumption of a service, it enters in a light sleep state and when the service ends, said mobile wireless device enters deep sleep state.

32. The device of claim 31, wherein said deep sleep state indicates that the direct data transfer link is inactive, but credentials for the direct data transfer link remain valid and can be used for a next service.

33. The device of claim 32, wherein said processor is further configured to control:
receiving of a traffic indication map (TIM) encapsulated in a data frame from an access point, for indicating that there is a data packet buffered in said initiating mobile wireless device for said mobile wireless device; and
receiving of the data packet over the direct data transfer link from said initiating mobile wireless device after the access point has notified said mobile wireless device that said initiating mobile wireless device has a data packet buffered for it.

34. The device of claim 26, wherein said indication of when a next period will start is included in a last message received by the mobile wireless device in a period in the direct data transfer link.

35. The device of claim 26, wherein the trigger signal is sent from the mobile wireless device over the direct data transfer link to the initiating mobile wireless device.

36. An apparatus, comprising:
means for receiving in a mobile wireless device an indication from an initiating mobile wireless device when a next active direct data transfer period will start so that the mobile wireless devices can remain in power save mode in a direct data transfer link until starting time of the period; and
means for sending to the initiating mobile wireless device, a trigger signal based on said indication, the trigger signal indicating that the next period is about to start, so that the initiating mobile wireless device can start transmitting data via the direct data transfer link.

37. A method, comprising:
receiving in a mobile wireless device an indication from an initiating mobile wireless device when a next active direct data transfer period will start so that the mobile wireless devices can remain in power save mode in a direct data transfer link until starting time of the period; and
sending to the initiating mobile wireless device, a trigger signal based on said indication, the trigger signal indicating that the next period is about to start, so that the initiating mobile wireless device can start transmitting data via the direct data transfer link.

38. The method of claim 37, wherein said indication of when a next period will start is included in a last message received in the direct data transfer link.

39. The method of claim 37, wherein the trigger signal is sent from the mobile wireless device over the direct data transfer link to the initiating mobile wireless device.

40. A computer program product, comprising:
a computer readable non-transitory medium configured to store program code executable by a computer processor;

program code in said computer readable medium for receiving in a mobile wireless device an indication from an initiating mobile wireless device when a next active direct data transfer period will start so that the mobile wireless devices can remain in power save mode in a direct data transfer link until starting time of the period; and program code in said computer readable medium for sending to the initiating mobile wireless device, a trigger signal based on said indication, the trigger signal indicating that the next period is about to start, so that the initiating mobile wireless device can start transmitting data via the direct data transfer link.

41. The computer program product of claim 40, wherein said indication of when a next period will start is included in a last message received in the direct data transfer link.

42. The computer program product of claim 40, wherein the trigger signal is sent from the mobile wireless device over the direct data transfer link to the initiating mobile wireless device.

* * * * *